United States Patent
Ahn

(10) Patent No.: US 8,544,032 B2
(45) Date of Patent: Sep. 24, 2013

(54) DISC DEVICE, A MULTIMEDIA APPARATUS INCLUDING A DISC DEVICE, AND A METHOD OF DRIVING THE DISC DEVICE

(75) Inventor: Cheol-woong Ahn, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/291,413

(22) Filed: Nov. 8, 2011

(65) Prior Publication Data
US 2012/0117579 A1 May 10, 2012

(30) Foreign Application Priority Data
Nov. 8, 2010 (KR) .................. 10-2010-0110434

(51) Int. Cl.
*G11B 17/05* (2006.01)
(52) U.S. Cl.
USPC ......................................... 720/623
(58) Field of Classification Search
USPC ......................................... 720/623
See application file for complete search history.

(56) References Cited

U.S. PATENT DOCUMENTS

| 7,644,419 | B2 | | 1/2010 | Shizuya et al. | |
|---|---|---|---|---|---|
| 8,082,558 | B2 | * | 12/2011 | Tsai et al. | 720/623 |
| 8,234,664 | B2 | * | 7/2012 | Wu et al. | 720/623 |
| 8,255,935 | B2 | * | 8/2012 | Miyata | 720/623 |
| 8,261,298 | B2 | * | 9/2012 | Huang et al. | 720/623 |
| 8,286,200 | B2 | * | 10/2012 | Tsutsumi et al. | 720/623 |
| 2008/0250438 | A1 | | 10/2008 | Chiou et al. | |
| 2009/0271810 | A1 | | 10/2009 | Ahn et al. | |

FOREIGN PATENT DOCUMENTS

| JP | 2008-171479 | 7/2008 |
|---|---|---|
| KR | 10-2007-0082502 | 8/2007 |

OTHER PUBLICATIONS

Korean Office Action issued Oct. 22, 2012 in counterpart Korean Application No. 10-2010-0110434 (5 pages, in Korean).

* cited by examiner

*Primary Examiner* — Mark Blouin
(74) *Attorney, Agent, or Firm* — NSIP Law

(57) ABSTRACT

A disc device that includes a loading unit configured to load an storage medium into the disc device, a chucking unit configured to accommodate the loaded storage medium thereon, an ejection unit configured to eject the storage medium, and a controller configured to control the loading unit, the chucking unit, and the ejection unit. The ejection unit moves the storage medium to a loading position for loading the storage medium onto the chucking unit when the storage medium is initially inserted.

21 Claims, 24 Drawing Sheets

DISC DEVICE, A MULTIMEDIA APPARATUS INCLUDING A DISC DEVICE, AND A METHOD OF DRIVING THE DISC DEVICE

CROSS-REFERENCE TO RELATED PATENT APPLICATION

This application claims the benefit of Korean Patent Application No. 10-2010-0110434, filed on Nov. 8, 2010, in the Korean Intellectual Property Office, the entire disclosure of which is incorporated herein by reference for all purposes.

BACKGROUND

1. Field

The following description relates to a method of driving a disc device, and additionally, to a method of controlling a disc device for stably accommodating a disc after power is supplied to the disc device.

2. Description of the Related Art

There are many forms of disc devices. For example, an optical disc device may be a slot-in type optical disc device. A slot-in type optical disc device uses two arms to load and unload a storage medium (e.g., a disc). In contrast to a conventional optical disc device in which a storage medium (e.g., a disc) is loaded by accommodating the storage medium (e.g., a disc) within or on a cassette, a tray, or the like, the slot-in type optical disc device may be loaded based on a storage medium (e.g., a disc) being inserted or ejected through a slim slot that is formed in one lateral surface of the slot-in type optical disc device. The slim slot is formed to have a width at least as large as the width of the storage medium (e.g., disc) to be loaded.

As power is supplied to a slot-in type optical disc device, the slot-in type optical disc device is initialized. During the initialization process, if a storage medium (e.g., a disc) was previously inserted into the optical disc device, the storage medium (e.g., a disc) is pushed out through a slot inlet so as to eject the storage medium (e.g., a disc). Thus, a user is required to push the storage medium (e.g., a disc) back into the optical disc device to insert the storage medium (e.g., a disc) into the optical disc drive. Because these processes are performed when power is supplied to the optical disc device, the user may not be necessarily inconvenienced by such processes caused by a conventional optical disc device.

However, a multimedia device, which is designed to minimize power consumption in a standby mode or a sleep mode, powers off an optical disc device when the multimedia device enters the standby or the sleep mode. If the multimedia device is in the standby or the sleep mode and an internal hard interrupt or a process event occurs, the optical disc device (in addition to the other components in the multimedia device) wakes up to enter an operation mode. During the process in which the optical disc device wakes up to enter an operation mode, the multimedia apparatus supplies power to the optical disc device. Accordingly, the optical disc device is initialized as power is supplied thereto. As described above, during such an initialization process, a storage medium (e.g., a disc) previously inserted in the optical disc device is pushed out (i.e., ejected). The user is required to push the storage medium (e.g., the disc) back into the optical disc device in order to access to contents stored on the storage medium. If the multimedia apparatus is powered-on, the standby or the sleep mode and the operation mode are repeated based on how the multimedia apparatus is used. Thus, the user may be inconvenienced by having to re-insert the storage medium (e.g., the disc) into the optical disc device whenever the optical disc device enters the operation mode.

SUMMARY

In one general aspect, there is provided a disc device. The disc device includes a loading unit configured to load an storage medium into the disc device; a chucking unit configured to accommodate the loaded storage medium thereon; an ejection unit configured to eject the storage medium; and a controller configured to control operation of the loading unit, the chucking unit, and the ejection unit, wherein the ejection unit moves the storage medium to a loading position for loading the storage medium onto the chucking unit when the storage medium is initially inserted.

The disc device may include an ejection unit that includes an ejection lever that is configured to engage the storage medium, an absorbing spring that is configured to exert an elastic force onto the ejection lever, and a bracket that is configured to support the absorbing spring while being coaxially rotated with the ejection lever.

The disc device may include an absorbing spring exerts the elastic force onto a predetermined region of the ejection lever when the ejection lever rotates the storage medium in a direction in which the storage medium is loaded.

The disc device may include a driving switch that is interconnected with the ejection unit and is connected to a circuit that is configured to drive the loading unit, wherein the driving switch maintains an on-state when the storage medium is initialized.

The disc device may include a loading unit that when the storage medium is initialized, loads the storage medium onto the chucking unit without a reset operation that initializes a system.

The disc device may include a controller that when the storage medium is inserted, if the controller is driven, the controller controls the loading unit and the chucking unit to load the storage medium onto the chucking unit.

The disc device may include a plurality of switches each of which detects the state of at least one of the loading unit, the chucking unit, and the ejection unit; and the controller controls operation of the loading unit, the chucking unit, and the ejection unit based on states of the switches at least a subset of the plurality of switches.

The disc device may include a controller configured such that when power is initially supplied to the disc device, the controller determines whether the storage medium is inserted, and based on such determination, if the storage medium is inserted then the loading unit loads the storage unit without initialization of the ejection unit; and if the storage medium is not inserted then the loading unit is initialized.

The disc device may be included in an electronic device.

The disc device may be included in one of one of a portable game console, a portable/personal multimedia player (PMP), a portable lap-top PC, a desktop PC, a game console, a high definition television (HDTV), an optical disc player/recorder, and a set top box In another aspect, there is included a multimedia apparatus. The multimedia apparatus includes a disc device comprising a loading device that is configured to load a storage medium into the disc device; a chucking unit that is configured to accommodate the loaded storage medium thereon, an ejection unit that is configured to eject the storage medium and to move the storage medium to a loading position for loading the storage medium to the chucking unit when the storage medium is inserted; and a controller that is configured to control operation of the loading unit, the chucking unit, and the ejection unit, and a output unit that is configured to output a signal provided from the disc device.

The multimedia apparatus may include an ejection unit that includes an ejection lever that is configured to push the disc, an absorbing spring that is configured to exert an elastic force onto the ejection lever, and a bracket that is configured to support the absorbing spring while being coaxially rotated with the ejection lever.

The multimedia apparatus may include an absorbing spring that exerts the elastic force onto a predetermined region of the ejection lever when the ejection lever rotates the storage medium in a direction in which the storage medium is loaded.

The multimedia apparatus may be configured such that when the disc device is not used, the disc device is powered off, and wherein, when a storage medium is inserted into the disc device, the disc device is driven by supplying power to the disc device.

In another aspect, there is provided a method of driving an disc device that includes a loading device that is configured to load a storage medium into the disc device; a chucking device that is configured to accommodate the loaded storage medium thereon, an ejection device that is configured to eject the storage medium for moving the storage medium to a loading position for loading the storage medium onto the chucking device when the storage medium is initially inserted; and a controller that is configured to control operation of the loading device, the chucking device, and the ejection device, the method comprising: supplying power to the disc device, determining whether the storage medium is in the loading position, if it is determined that the storage medium is inserted, loading the storage medium by the loading device without initialization of the ejection device, and initializing the loading device when the storage medium is not inserted.

The multimedia apparatus may include an ejection device that includes an ejection lever that is configured to push the storage medium, an absorbing spring that is configured to exert an elastic force onto the ejection lever, and a bracket that is configured to support the absorbing spring while being coaxially rotated with the ejection lever.

The multimedia apparatus may include an absorbing spring that exerts the elastic force onto a predetermined region of the ejection lever only in when the ejection lever rotates the storage medium in a direction in which the storage medium is loaded.

The multimedia apparatus may be configured such that when the storage medium is inserted into the disc device, the power is supplied to the disc device.

The multimedia apparatus may include a disc device that is connected to a multimedia apparatus comprising an output device, and wherein, when the storage medium is inserted into the disc device, the power is supplied from the multimedia apparatus.

The method may include the multimedia apparatus shutting the power to the disc device when the disc device is not used.

Other features and aspects may be apparent from the following detailed description, the drawings, and the claims.

BRIEF DESCRIPTION OF THE DRAWINGS

FIG. 15 is a drawing illustrating an example of a storage medium being inserted to a position such that a driver in a disc device is powered on.

Figure 1:
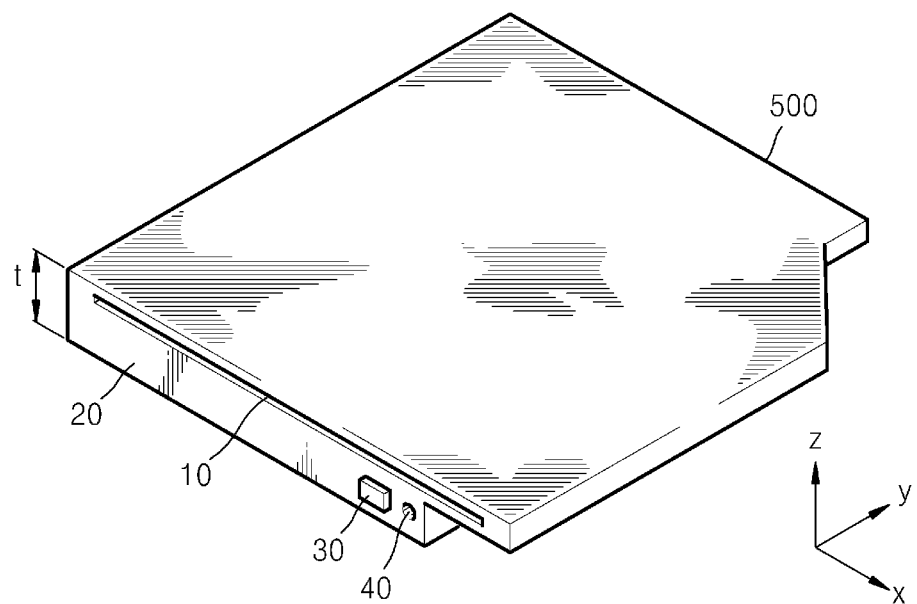
FIG. 1 is a drawing illustrating an example of a disc device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a drawing that illustrates an example of a disc device. The disc device may be used to read or write data to a storage medium. For example, the storage medium may be an optical disc such as a CD-ROM, a CD-RW, a DVD, a DVD-RW, a Blu-ray disc (BD), and/or the like. A bezel 20 is formed on a front surface of the disc device 500. A slot 10 formed in the bezel 20 serves as a path for inserting or ejecting a storage medium (e.g., disc). If an eject button 30, which is formed on the bezel 20, is pushed, the storage medium (e.g., the disc) loaded in the optical disc device is unloaded. An operational state of the disc device is displayed on a mark lamp 40 connected to a driver (not shown) or a controller (not shown). In other words, the mark lamp 40 displays a status of the disc device 500 based on the operational state of the disc device 500.

Figure 2:
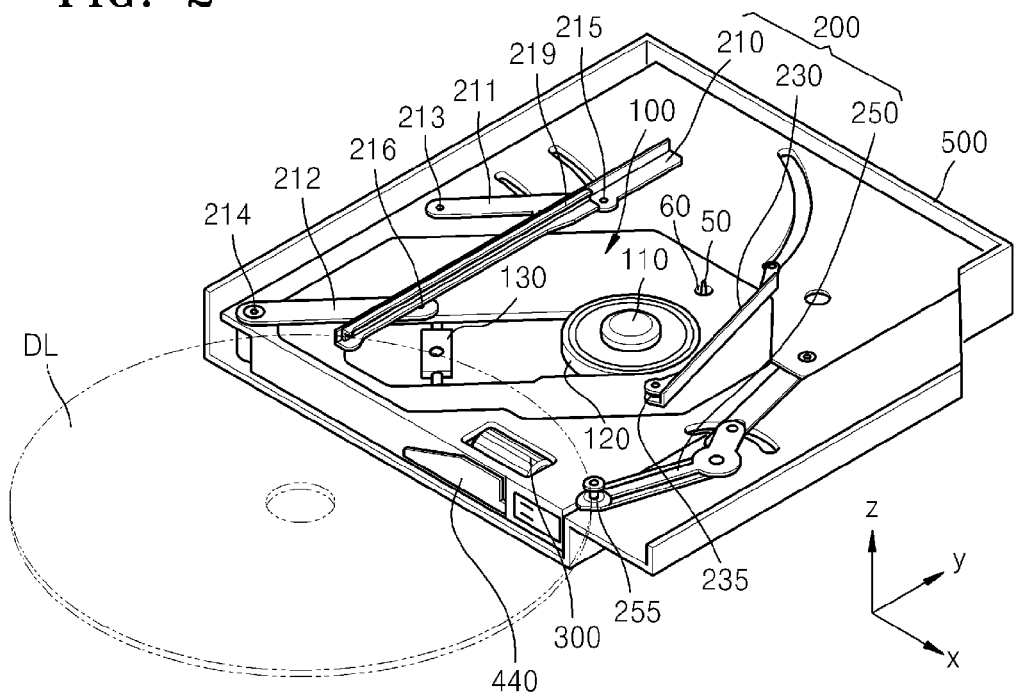
FIG. 2 is a drawing illustrating an example of a large-diameter storage medium engaging a guide lever and a loading lever in a disc device.

As an example, the disc device may be an optical disc device. In particular, the optical disc device may be a slim-type optical disc device that is may be configured to be installed in a notebook computer. A slim-type optical disc device has a limited thickness 't' (e.g., 12.7 mm). Because of the compact size of a slim-type optical disc device and the relatively small number of components required for the manufacture thereof, it is often advantageous to use a lever member 200 (e.g., as illustrated in FIG. 2) and drivers (not shown). As will be described below, even as a storage medium (e.g., the disc) is inserted into the disc device 500 immediately before a system of the disc device is stabilized, the storage medium (e.g., the disc) is chucked on the disc device 500 rather than being ejected from the disc device 500.

FIG. 2 is a drawing illustrating an example of a large-diameter storage medium DL engages a guide lever 210 and a loading lever 250 in an disc device 500. For example, FIG. 2 illustrates a large-diameter storage medium DL pushing the guide lever 210 and a loading lever 250. FIG. 2 shows a main unit 100 and the lever member 200.

The main unit 100 includes a turntable 110 on which the large-diameter storage medium (e.g., the disc) DL is mounted, a spindle motor 120 configured to rotate the turntable 110, a pickup 130 (e.g., an optical pickup) that is configured to write or read data to or from the large-diameter storage medium DL, and a motor (e.g., a feeding motor), which is not shown, that is configured to move the pickup 130 in a tracking direction of the large-diameter storage medium DL. For example, the pickup 130 may read or write data to or from the large-diameter storage medium DL by emitting light to the large-diameter disc DL.

The lever member 200 guides the large-diameter storage medium DL, which is inserted through the slot 10, so as to coaxially load the large-diameter storage medium DL on the turntable 110 and to chuck the large-diameter storage medium DL on the turntable 110. The lever member 200 also guides the large-diameter storage medium DL so as to unchuck the large-diameter storage medium DL from the turntable 110 and to unload or eject the large-diameter storage medium DL in an direction opposite to that of the loading direction. A driver described later loads/unloads the large-diameter storage medium DL by driving the lever member 200, and chucks/unchucks the large-diameter storage medium DL on/from the turntable 110 by raising or lowering the main unit 100. The lever member 200 includes an ejection lever 230, the guide lever 210, and the loading lever 250. The loading and unloading of the large-diameter storage medium DL is carried out by the controller (or the driver) which is configured to control the entire system.

The ejection lever 230 provides power required to unload the large-diameter disc DL by exerting an elastic force onto the large-diameter storage medium DL in an unloading direction (i.e., a −y-axis direction). The power distributed to the large-diameter storage medium DL may be appropriately adjusted by a compressive force (or a pressing force) that is applied by a spring 710 (refer to FIG. 14) which will be described below.

The guide lever 210 may include a disc guiding surface 219 that linearly extends in the loading direction (i.e., a +y-axis direction). The guide lever 210 may also have an articulated structure—for example, four articulated portions. Further, the guide lever 20 may be kept in a state in which the guide lever 210 is positioned substantially parallel to the loading direction during operation. Accordingly, the disc device 500 maintains a stable loading/unloading operation.

In order to maintain a movement direction of the guide lever 210, the guide lever 210 is operatively coupled to a first subsidiary link 211 and a second subsidiary link 212. As the guide lever 210 moves, the remains coupled to the first subsidiary link 211 and the second subsidiary link 212 such that the guide lever 210 is positioned relative to the first and second subsidiary links 211 and 212 so as to form an imaginary parallelogram. A first end portion of the first subsidiary link 211 is pivotally coupled to a first subsidiary link hinge 213 which is formed on a side of the disc device. The first subsidiary link 211 rotates around the first subsidiary link hinge 213 as the guide lever 210 moves. A second end portion of the first subsidiary link 211 is pivotally coupled to a first guide lever hinge 215 which is formed at the guide lever 210 side. Similarly, a first end portion of the second subsidiary link 212 is pivotally coupled to a second subsidiary link hinge 214 which is formed on a side of the disc device. The second subsidiary link 212 rotates around the second subsidiary link hinge 214 as the guide lever 210 moves. A second portion of the second subsidiary link 212 is pivotally coupled to a second guide lever hinge 216 which is formed at the guide lever 210 side. As an example, a length of the first subsidiary link 211 may be equal to a length of the second subsidiary link 212.

The loading lever 250 is disposed adjacent to the slot 10 of the disc device 500, and pushes the large-diameter storage medium DL to load the large-diameter storage medium DL. In order to unload the large-diameter storage medium DL, the loading lever 250 moves in a direction opposite that of the loading direction, thereby guiding to guide the large-diameter storage medium DL towards the slot 10. The guide lever 210 and the loading lever 250, which are driven by a plurality of cams, may be elastically biased in one direction so as to correctly control positions thereof. For example, the disc device may include a spring that biases the guide lever 210 and the loading lever 250. Thus, the disk device may include a guide lever spring 218 (refer to FIG. 7). The guide lever spring 218 exerts an elastic force that acts on the first subsidiary link 211 which contacts the large-diameter storage medium DL. The guide lever 210 is elastically biased in a direction such that it maintains contact with the large-diameter storage medium DL. Although not illustrated, the loading lever 250 and the ejection lever 230 may also include respective elastic members that exert elastic forces in a direction so as to maintain contact with the large-diameter storage medium DL.

Figure 3:
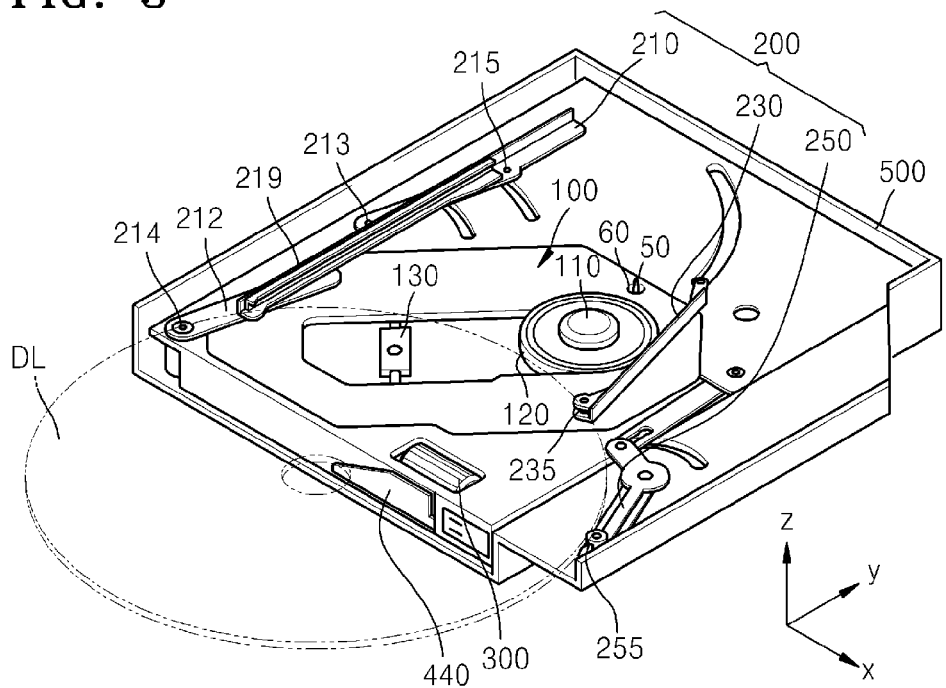
FIG. 3 is a drawing illustrating an example of a large-diameter storage medium moving a guide lever and a loading lever and then engaging an ejection lever in a disc device.

FIG. 3 is a drawing illustrating an example of large-diameter storage medium DL being inserted into the slot 10 of the disk drive 500. As the storage medium DL is inserted, the storage medium DL moves the guide lever 210 and the loading lever 250 and then engages the ejection lever 230 in the disc device 500.

If both the guide lever 210 and the loading lever 250 are pushed by the large-diameter storage medium DL which is inserted into the disc device 500, a locking of the guide lever 210 and the loading lever 250 is released. If the large-diameter storage medium DL is inserted into the disc device 500, the guide lever 210 moves so as to ensure that a loading space is sufficient to incorporate the large-diameter storage medium within the disc drive 500. As the large-diameter storage medium is further inserted into the slot 10 of the disc drive 500, the large-diameter storage medium DL continually moves so as to start to engage and push the ejection lever 230. A lever member 200 is driven by a driver that is powered on/off by a driving switch 460 (refer to FIG. 11).

Although not illustrated, when the large-diameter storage medium DL is manually inserted into the slot 10 of the disc drive 500, if the large-diameter storage medium DL moves to an on-position of the driving switch 460, the driving switch 460 is switched on so that the driver starts operating. In addition, when the large-diameter storage medium DL is unloaded or ejected, if the large-diameter storage medium DL deviates from the on-position of the driving switch 460, the driving switch 460 is switched off so that the driver stops operating. In this case, the large-diameter disc DL may be unloaded or ejected by an elastic force.

As shown in FIGS. 11 through 21, the driving switch 460 is disposed at a predetermined position on a trajectory of the ejection lever 230. The driving switch 460 is switched on/off based on a rotation degree of the ejection lever 230. If a disc that is manually inserted into the disc device is moved so that the distance between a corresponding portion of the guide lever 210 and the disc contact portion 255 of the loading lever 250 is equal to a diameter of the storage medium, the driving switch 460 is switched on thereby initiating operation of the driver, and the storage medium is automatically loaded.

Figure 4:
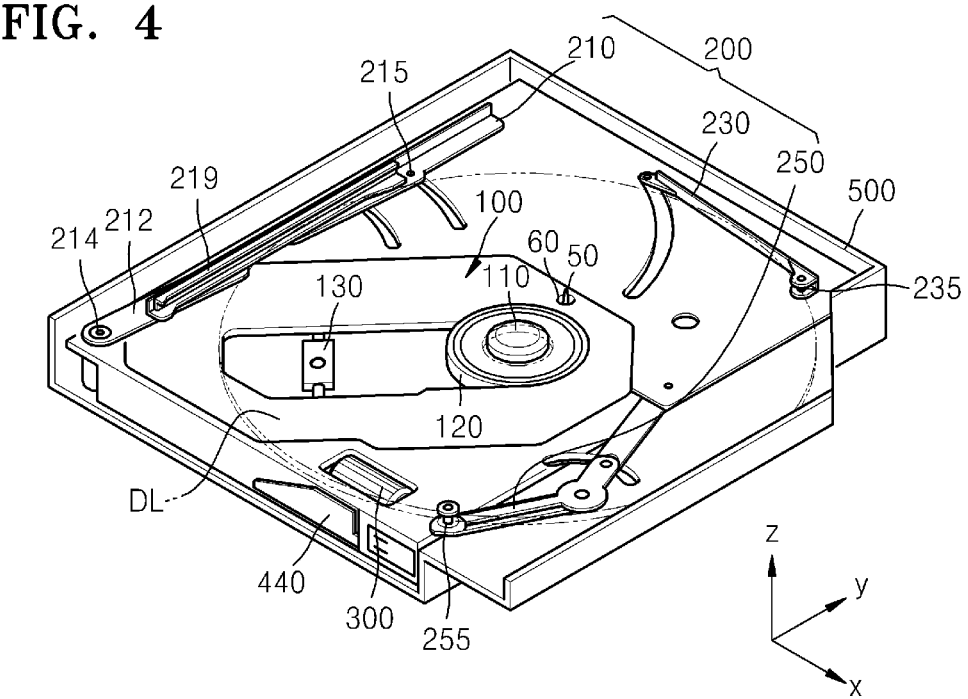
FIG. 4 is a drawing illustrating an example of a large-diameter storage medium loaded in a disc device such that the storage medium is not chucked on a turntable of the disc device.
Figure 5:
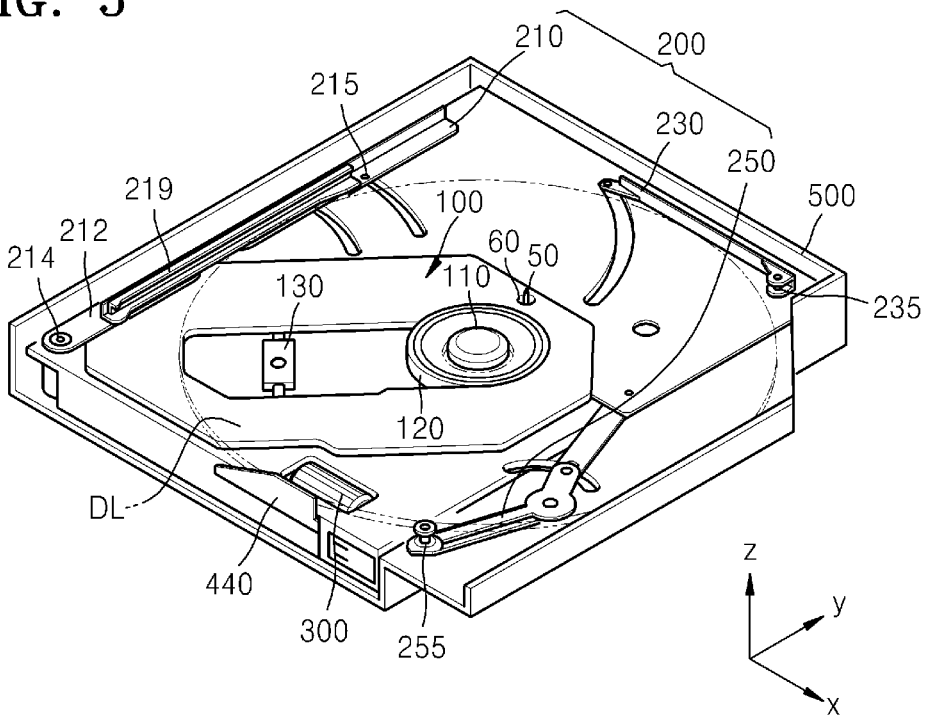
FIG. 5 is a drawing illustrating an example of the large-diameter storage medium of FIG. 4 disposed in a position so as to be completely chucked on a turntable and such that a lever member escapes.

FIG. 4 is a a diagram illustrating the large-diameter storage medium DL loaded in a disc device 500. As illustrated in FIG. 4, the storage medium DL is not yet chucked in the disc device. The large-diameter storage medium DL is coaxially loaded on the turntable 110 as a driver raises the main unit 100 so as to chuck the large-diameter medium DL on the turntable 110. FIG. 5 is a drawing illustrating an example of the large-diameter storage medium DL of FIG. 4 disposed so as to be completely chucked on the turntable 110 and the lever member 200 moves so as to recede from an outer circumference of the large-diameter storage medium DL. In other words, if the large-diameter storage medium DL is completely chucked on the turntable 110, the lever member 200 recedes from an outer circumference of the large-diameter storage medium DL so as to allow the large-diameter disc DL to rotate (e.g., such that frictional forces are not created between the lever member 200 and the storage medium DL as it rotates). The driver makes the lever member 200 to recede or otherwise move away from contact with a lateral surface of large-diameter storage medium DL.

The unlocking and unchucking are performed in an order that is in reverse to the order of operations illustrated and described with regard to FIGS. 2 through 5. For example, an unchucking rod 50 is formed on a frame of the disc drive 500. An unchucking rod hole 60 through which the unchucking rod 50 moves so as to engage the large-diameter storage medium DL therethrough. The unchucking rod 50 recedes into the unchucking rod hole 60 when the large-diameter disc DL is unchucked. Although not illustrated, a main unit boss is formed on a lateral surface of the main unit 100, and a main unit cam connected to the main unit boss is formed on a lateral surface of a main slider 350. Thus, the main slider 350 moves linearly to raise and lower the main unit 100. If the main unit 100 is lowered, the unchucking rod 50 protrudes through the unchucking rod hole 60 so as to unchuck the large-diameter disc DL. The unchucking rod 50 may progressively protrude through the unchucking rod hole 60 as the main unit 100 is lowered.

Figure 6:
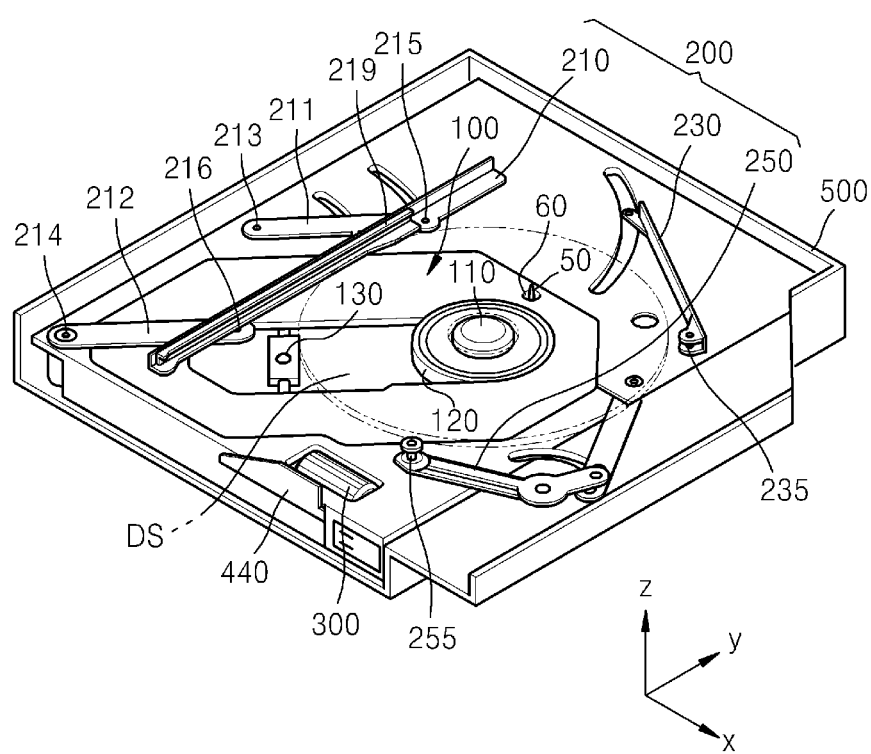
FIG. 6 is a drawing illustrating an example of a small-diameter storage medium is disposed in a position so as to be completely chucked on a turntable and such that a lever member recedes.

FIG. 6 is a drawing that illustrates an example of a small-diameter storage medium DS (e.g., a disc) disposed in a position so as to be completely chucked on the turntable 110 and the lever member 200 recedes from the outer circumference of the storage medium. The lever member recedes from the storage medium so as to allow the storage medium to rotate freely. The lever member 200 operates so as to have a trajectory that varies based on a diameter of a disc. For example, comparing the examples illustrated in FIGS. 5 and 6, if a small-diameter storage medium DS (e.g., a disk) is loaded into the disc device, the guide lever 210 maintains a locking state during a standby mode and a loading mode, and recedes or moves away from a lateral surface of a disc if the storage medium DS is completely chucked. A rotation degree of the loading lever 250 if a small-diameter storage medium DS (e.g., a disc) is loaded into the disc device is greater than the rotation degree of the loading lever 250 if a large-diameter storage medium DL (e.g., a disc) is loaded into the disc device. A movement degree of the ejection lever 230 if a small-diameter storage medium DS (e.g., disc) is loaded into the disc device is smaller than the movement degree of the ejection lever if a large-diameter storage medium DL (e.g., a disc) is loaded into the disc device.

As an example, as illustrated in FIGS. 5 and 6, a shutter 440 may be operatively coupled to the disc drive. The shutter 440 may be moved so as to shut the slot 10. For example, the shutter 440 may be raised in order to shut the slot 10. As an example, if a storage medium (e.g., a disc) is loaded into a disc device, insertion of any additional storage medium into the disc device is likely to damage the lever member 200. If a storage medium is loaded into the slot 10, then the shutter 440 is raised to shut the slot 10. As the disk is unloaded, the shutter 440 is moved so as to open the slot 10. For example, the shutter 440 may be lowered to open the slot 10. The shutter 440 may be operated by the main slider 350 as described below. A method of operating the shutter 440 by the main slider 350 may be changed in various ways, and is not illustrated.

Figure 7:
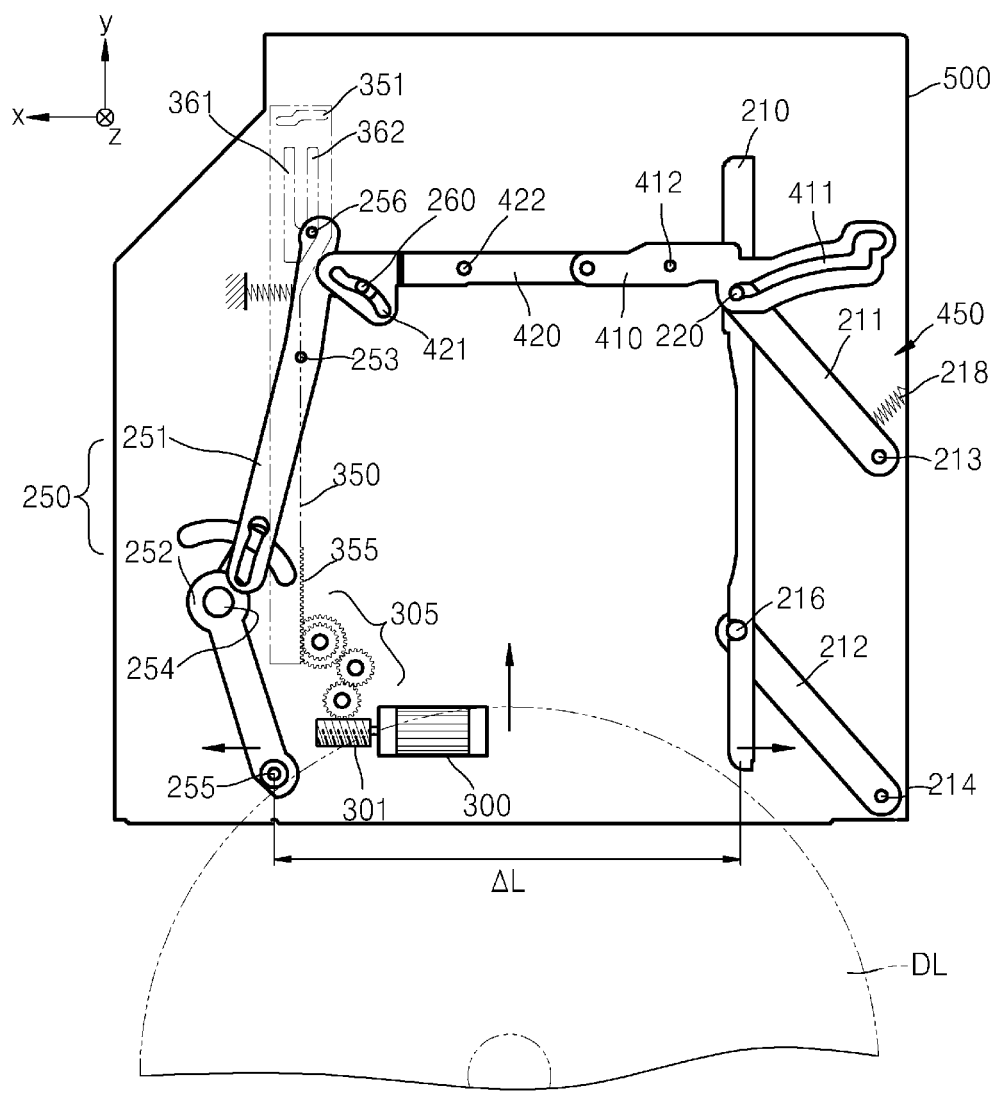
FIG. 7 is a drawing illustrating an example of a locker and a lever member in a locked position.
Figure 8:
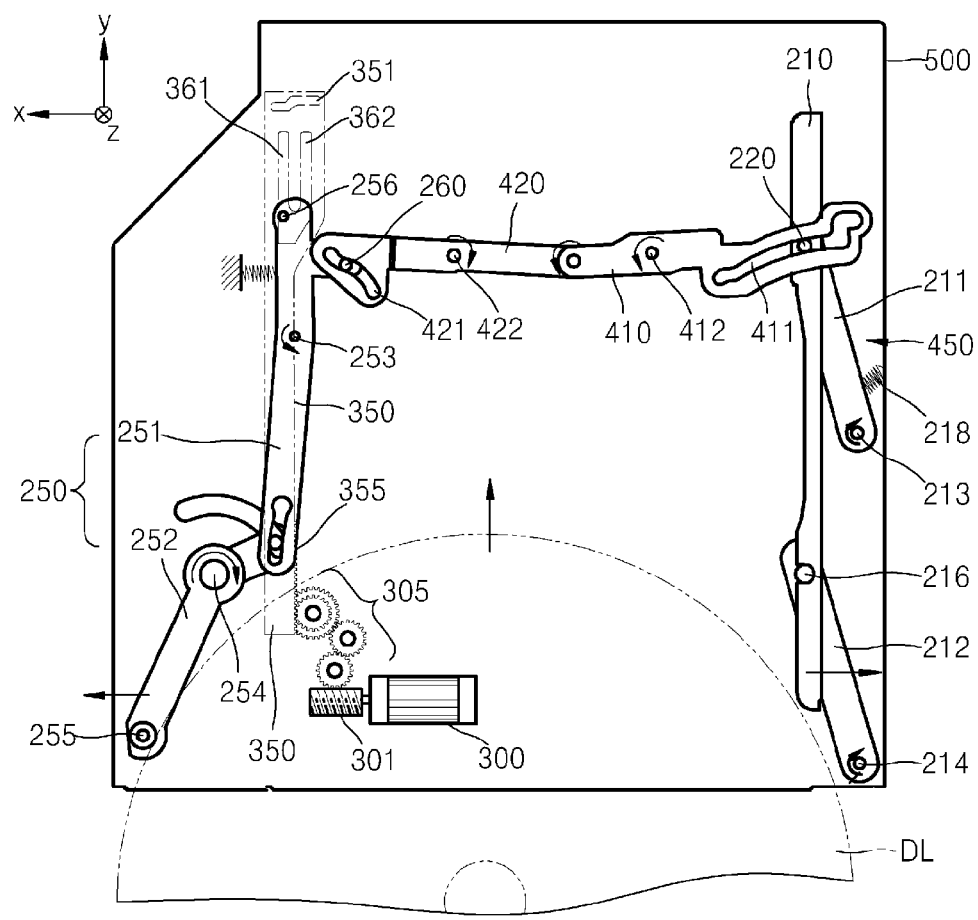
FIG. 8 is a drawing illustrating an example of a locker and a lever member being pushed by a large-diameter storage medium so as to release locking.

FIG. 7 is a drawing illustrating an example of a locker and the lever member 200 in a locked position. FIG. 8 is a drawing illustrating an example of the locker and the lever member 200 being pushed by the large-diameter storage medium DL so as to release locking. FIGS. 7 and 8 show the locker and the driver. The locker locks the guide lever 210 and the loading lever 250 in a standby mode. As a storage medium is manually inserted into the slot 10, if both the guide lever 210 and the loading lever 250 are pushed, the locking is released. The driver may include a driving source 300 and the main slider 350. The main slider 350 is connected to the driving source 300 by a worm gear 301, a gear train 305, and a rack 355, and moves linearly to operate the lever member 200.

The main slider 350 may include a first loading cam 361 and a second loading cam 362, each of which is shaped like a groove (e.g., a channel). The first loading cam 361 and the second loading cam 362 are separately used to operate the loading lever 250 according to a diameter of the storage medium. Thus, the loading lever 250 moves along a trajectory that varies according to a diameter of a storage medium. In order to load the large-diameter storage medium DL (e.g., a large-diameter disc), the loading lever 250 operates with the first loading cam 361 so as to move the large-diameter storage medium DL. In order to load the small-diameter storage medium DS (e.g., a small-diameter disc), the loading lever 250 operates with the second loading cam 362 so as to move the small-diameter storage medium DS.

In a standby mode, if a storage medium is manually inserted into the slot 10, any of the first and second loading cams 361 and 362 is selected based on a movement degree of the loading lever 250 as it is engaged and moved by the storage medium. A loading boss 256 formed on the loading lever 250 is connected to any one of the first and second loading cams 361 and 362 according to the disc inserted into the slot 10.

As shown in FIG. 7, in a standby mode, the loading boss 256 is positioned adjacent to the second loading cam 362. However, as illustrated in FIG. 8, for example, as the large-diameter storage medium DL is manually inserted into the slot 10, the loading lever 250 rotates such that the loading boss 256 moves to a position that is adjacent to the first loading cam 361. For example, because a rotation degree of the loading lever 250 is large (e.g., relative to the rotation degree corresponding to insertion of a storage medium having a smaller diameter), the loading boss 256 moves to a position that is adjacent to the first loading cam 361. As the large-diameter disc DL is further manually inserted into the slot 10, the driver may be powered on. Accordingly, a driving force of the driver is transmitted to the main slider 350 so that the loading boss 256 may move along the first loading cam 361.

Figure 9:
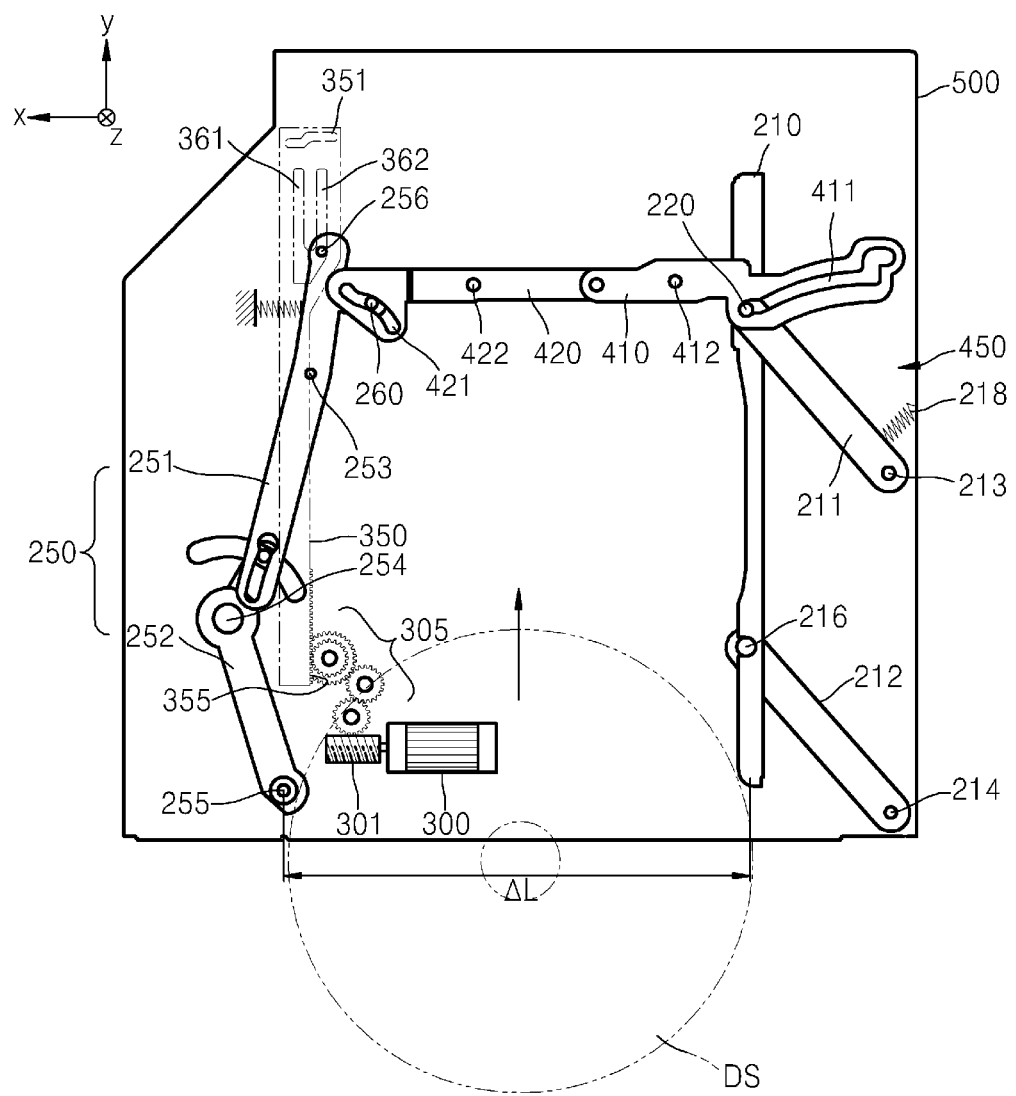
FIG. 9 is a drawing illustrating an example of a relationship between a locker and a small-diameter storage medium.

As illustrated in FIG. 9, as the small-diameter storage medium DS is manually inserted into the slot 10, a rotation degree of the loading lever 250 is small (e.g., relative to the rotation degree corresponding to insertion of a storage medium having a large diameter), the loading boss 256 may not deviate from a position that is adjacent to the second loading cam 362 and corresponds to a standby mode. As the small-diameter storage medium DS is further manually inserted into the slot 10, the driver may be powered on. Accordingly, a driving force of the driver is transmitted to the main slider 350 so that the loading boss 256 may move along the second loading cam 362. Thus, the loading boss 256 and the loading lever 250 connected to the loading boss 256 have different trajectories based on the diameter of a storage medium loaded into the disk drive.

The loading lever 250 includes a first loading lever 251 and a second loading lever 252. An end portion of the first loading lever 251 is operatively connected to the main slider 350 through the loading boss 256. The first loading lever 251 rotates around a first loading lever hinge 253. The second loading lever 252 rotates around a second loading lever hinge 254. A first end portion of the second loading lever 252 is pivotally coupled to the first loading lever 251, and a second end portion of the second loading lever 252 includes the disc contact portion 255 which a storage medium engages as the storage medium is inserted into the disk drive.

As an example, the locker may include a first link 410 and a second link 420. The first link 410 includes a first cam 411. The first cam 411 may be configured to move such that the first link 410 may rotate around a first hinge 412. The first cam 411 is connected to a first boss 220 formed on the guide lever 210. The second link 420 may include a second cam 421. The second cam 421 may be configured to move such that the second link 420 may rotate around a second hinge 422. The second cam 421 is operatively connected to a second boss 260 which is formed on the loading lever 250.

Figure 10:
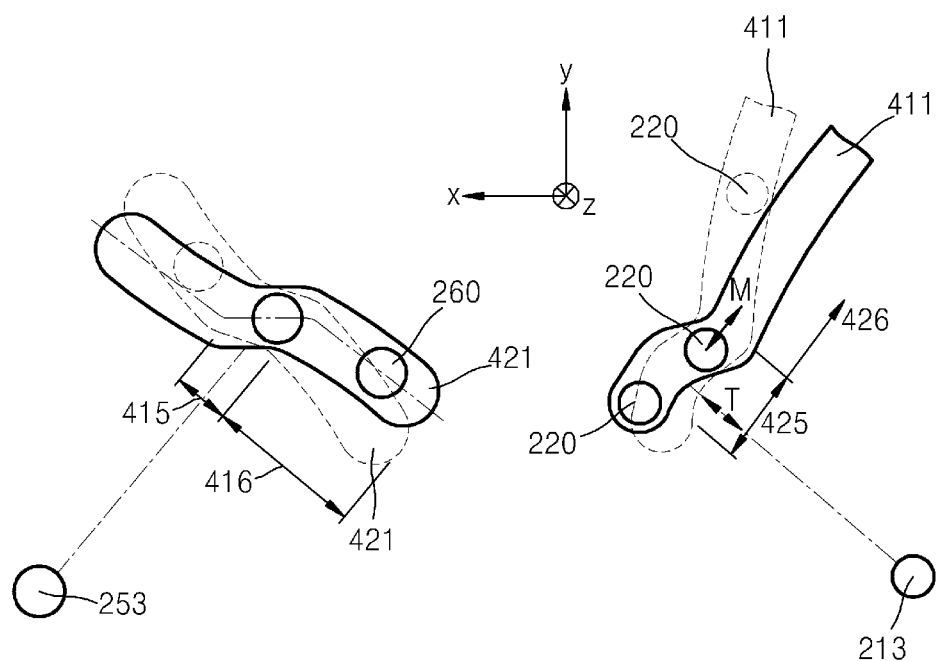
FIG. 10 is a drawing illustrating an example of magnified portions of first and second locking units.

End portions of the first and second links 410 and 420 are pivotally coupled to each other. The first and second links 410 and 420, are each respectively opposite to end portions that are adjacent to the first and second cams 411 and 421 with respect to the first and second hinges 412 and 422. As illustrated in FIG. 10, the first and second cams 411 and 421 respectively include a first locking unit 415 and a second locking unit 425 which are formed at bent portions of the first and second cams 411 and 421, respectively. The first locking unit 415 regulates the first boss 220 so as to lock the guide lever 210. The second locking unit 425 regulates the second boss 260 so as to lock the loading lever 250. As the large-diameter storage medium DL is manually inserted, if the first and second links 410 and 420 that are pivotally coupled to each other rotate in opposite directions, bending degrees of the first and second locking units 415 and 425 are reduced, thereby releasing locking of the guide lever 210 and the loading lever 250. Conversely, if the small-diameter storage medium DS is manually inserted, because the first and second links 410 and 420 may not rotate in opposite directions, the locking of the guide lever 210 and the loading lever 250 may not be released.

FIG. 10 is a drawing illustrating an example of magnified portions of the first and second locking units 415 and 425 of FIG. 8. FIGS. 7, 8, and 10 illustrate the first subsidiary link hinge 213 as a rotation center of the first boss 220 and the first loading lever hinge 253 as a rotation center of the second boss 260. Referring to FIG. 10, positions of the first cam 411 and the second cam 421 in a locking state are indicated by solid lines, and positions of the first cam 411 and the second cam 421 when the locking is released are indicated by dotted lines.

For example, in the locking state, when the large-diameter storage medium DL is manually inserted (i.e., pushed into the slot), a rotation force is exerted counterclockwise on the first loading lever 251 around the first loading lever hinge 253. A rotation force is exerted clockwise on the second link 420 around the second hinge 422 by the second boss 260. A rotation force is exerted clockwise on the first link 410 that is pivotally coupled to the second link 420 and rotates in an opposite direction to the second link 420, around the first hinge 412. For example, the first cam 411 is indicated by the dotted line in FIG. 10. However, because the first locking unit 415 exerts tension to the first boss 220 by using the first subsidiary link hinge 213 as a reference point, locking of the first boss 220 is not released.

If a rotation force is exerted clockwise to the first subsidiary link 211 disposed at the guide lever 210 side, a rotation force M is exerted on the first boss 220 via the first subsidiary link hinge 213 as a reference point, and a shape of the first cam 411 is indicated by, for example, the dotted line in FIG. 10. Thus, a bending degree of the first locking unit 415 is reduced. The first boss 220 onto which the rotation force M is exerted is moved through an assembly gap formed in the middle of the first locking unit 415 in a zigzag form so as to easily release locking. For example, locking is released only when both the loading lever 250 and the guide lever 210 are pushed. If only one of the loading lever 250 and the guide lever 210 is pushed, locking is not released.

FIG. 9 is a drawing illustrating an example of a relationship between a locker and a small-diameter storage medium DS. A distance ΔL between the guide lever 210 and the loading lever 250, which is measured adjacent to the slot 10 in a standby mode, may be greater than a diameter of the small-diameter storage medium DS, and may be smaller than a diameter of the large-diameter storage medium DL. Thus, if the large-diameter storage medium DL is manually inserted into the slot as the disk drive is in the standby mode, because the guide lever 210 and the loading lever 250 are simultaneously pushed by the large-diameter storage medium DL, locking is released. However, if the small-diameter storage medium DS is manually inserted, because only any one of the guide lever 210 and the loading lever 250 is pushed by the small-diameter disc DS, locking is not released.

Referring back to FIG. 10, the first and second cams 411 and 421 include first and second loading portions 416 and 426, respectively. For example, as the large-diameter storage medium DL is loaded, the first and second bosses 220 and 260 move along the first and second loading portions 416 and 126 to load/unload the large-diameter storage medium DL. For example, as the small-diameter storage medium DS is loaded, the first boss 220 is locked, and the second boss 260 moves along the second loading portion 426 to load/unload the small-diameter disc DS. The small-diameter storage medium DS moves between the guide lever 210 and the loading lever 250, which are locked, to move the ejection lever 230 and to switch-on the driving switch 460. If the driving switch 460 is switched on, the loading lever 250 moves along the second loading portion 426 to load the small-diameter storage medium DS, in spite of locking of the guide lever 210. In other words, the guide lever 210, the ejection lever 230, and the loading lever 250 move simultaneously to load/unload the large-diameter disc DL. In addition, the guide lever 210 is locked, and the ejection lever 230 and the loading lever 250 move to load/unload the small-diameter storage medium DS.

As an example, a disc device may include a diameter detector that is configured to detect a diameter of a storage medium which is inserted into the slot 10. The diameter detector may detect the diameter of the storage medium as the storage medium is being inserted into the slot 10. The diameter detector may include a guide lever switch 450. If the guide lever switch 450 is pressed as a disc is loaded to contact the guide lever 210, the diameter detector determines that a large-diameter storage medium DL is loaded. Operation timing of the driver is determined by the diameter detector and the driving switch 460. If the diameter detector determines that the large-diameter storage medium DL is loaded, the lever member 200 may be moved to a position as illustrated in FIG. 5 by controlling the operational timing of the driver. If the diameter detector determines that a small-diameter storage medium DS is loaded, the lever member 200 may be moved to a position in FIG. 6 by controlling the operational timing of the driver. Thus, a plurality of driving switches 460 may be disposed at different positions so as to differentiate on-positions of the driving switches 460 based on a diameter of a storage medium loaded into the disc device.

Figure 11:
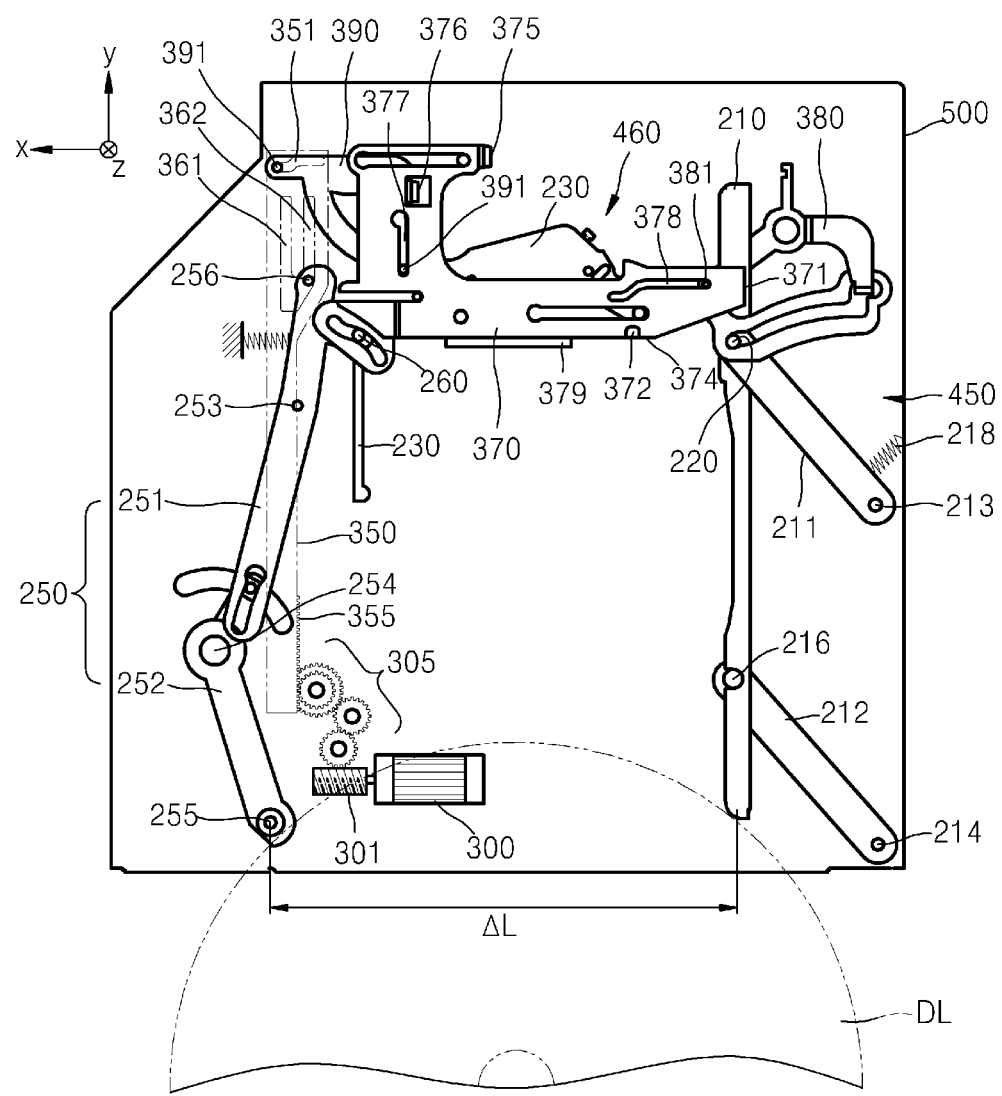
FIG. 11 is a drawing illustrating an example of a standby mode of a sub slider.
Figure 12:
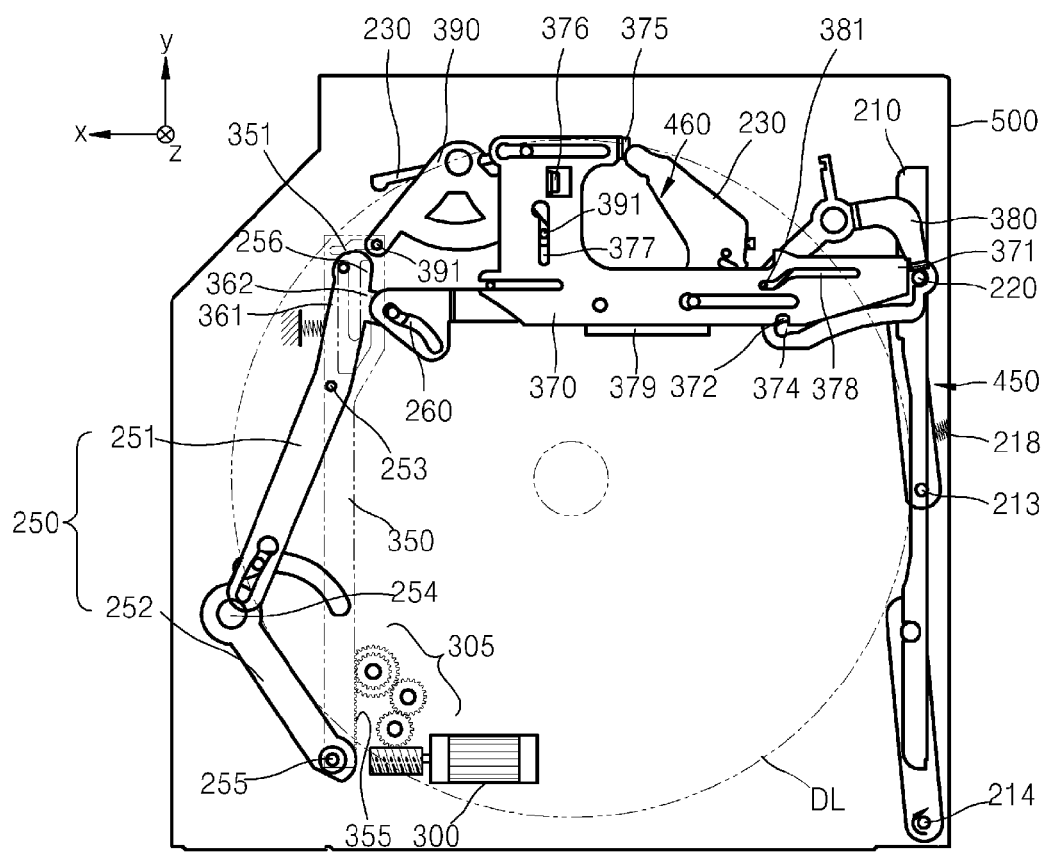
FIG. 12 is a drawing illustrating an example of a state of a sub slider if a large-diameter storage medium is completely chucked.
Figure 13:
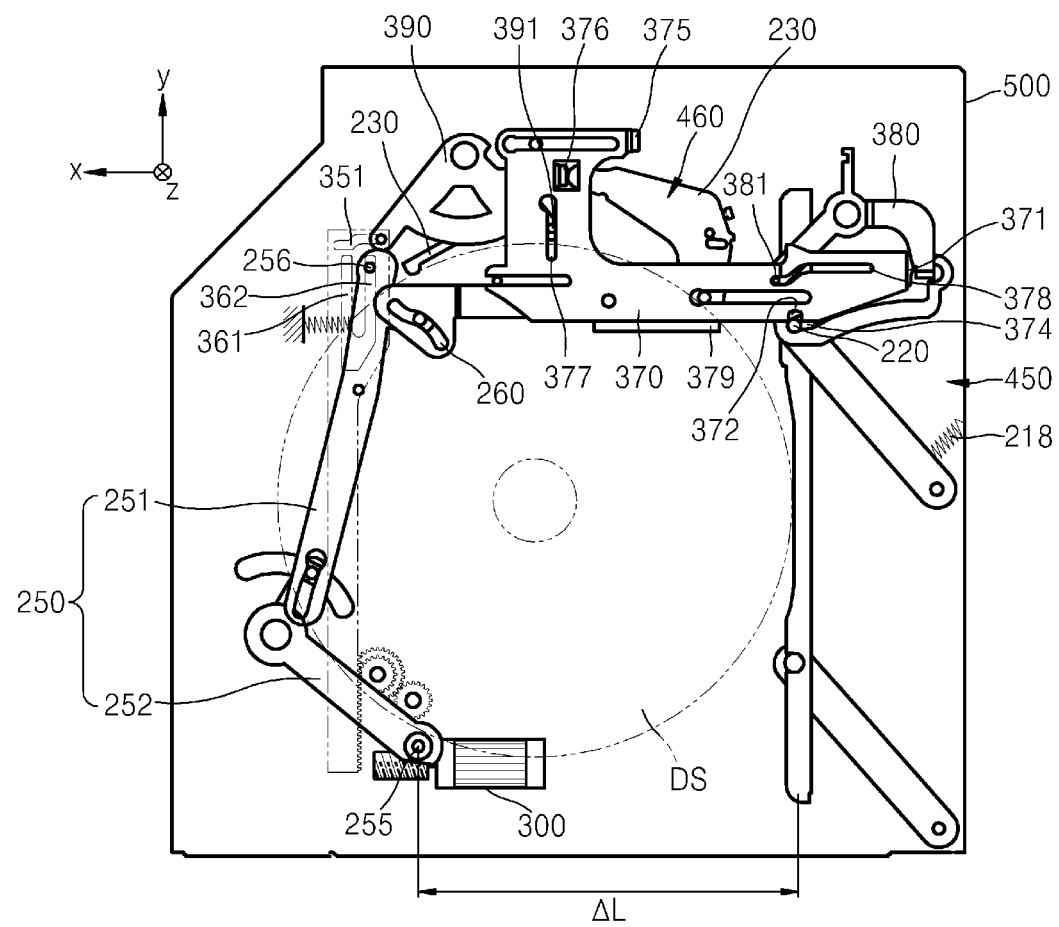
FIG. 13 is a drawing illustrating an example of a state of a sub slider if a small-diameter storage medium is completely chucked.

FIG. 11 is a drawing illustrating an example of a standby mode of a sub slider 370. FIG. 12 is a drawing illustrating an example of a state of the sub slider 370 when a large-diameter storage medium DL is completely chucked. Referring to FIGS. 11 through 13, the driver may further include, for example, the sub slider 370, a guide lever regulating link 380, and a connection link 390.

The sub slider 370 is connected to the main slider 350 through the connection link 390 and reciprocates. The sub slider 370 includes first and second guide lever escaping portions 371 and 372 for moving away the guide lever 210 to different positions based on a diameter of a storage medium, and first and second ejection lever escaping portions 375 and 376 for moving away the ejection lever 230 to different positions based on the diameter of the storage medium.

The first guide lever escaping portion 371 makes the guide lever 210 recede (i.e., move away) from a lateral surface of the storage medium if the large-diameter storage medium DL is completely chucked. The second guide lever escaping portion 372 makes the guide lever 210 recede (i.e., move away) from the lateral surface of the storage medium if the small-diameter storage medium DS is completely chucked. The first ejection lever escaping portion 375 makes the ejection lever 230 recede (i.e., move away) from the lateral surface of the storage medium when the large-diameter storage medium DL is completely chucked. The second ejection lever escaping portion 376 makes the ejection lever 230 recede (i.e., move away) from the lateral surface of the storage medium when the small-diameter storage medium DS is completely chucked. Any one of the first and second guide lever escaping portions 371 and 372 is selected based on a movement degree of the guide lever 210 that is pushed by a storage medium as the guide lever 2010 and the storage medium start to move. Further, any one of the first and second ejection lever escaping portions 375 and 376 is selected based on a movement degree of the ejection lever 230 that is pushed by the storage medium as the ejection lever 230 and storage medium start to move.

The sub slider 370 may include a guide lever regulator 374 that is configured to regulate movement of the guide lever 210 so as to push the guide lever 210 towards a lateral surface of the small-diameter storage medium DS as the small-diameter storage medium DS is loaded. The sub slider 370 may further include a chucking/unchucking guide 379 for guiding the main unit 100 to be raised/lowered as a storage medium is chucked/unchucked.

The guide lever regulating link 380 regulates movement of the guide lever 210 so as to push the guide lever 210 towards the lateral surface of the large-diameter storage medium DL as the large-diameter storage medium DL is loaded. In addition, if the large-diameter storage medium DL is completely chucked, the guide lever regulating link 380 is rotated by the sub slider 370 so as to release the regulating of the movement of the guide lever 210. The guide lever regulating link 380 is operated by connecting a guide lever regulating link boss 381 formed on the guide lever regulating link 380 to a guide lever regulating link cam 378 formed on the sub slider 370.

The connection link 390 interconnects the main slider 350 and the sub slider 370 with each other. The connection link 390 is operated by connecting connection link cams 351 and 377 that are respectively formed on the main slider 350 and the sub slider 370 to a connection link boss 391 formed on the connection link 390. If a storage medium is completely chucked, the loading lever 250 recedes (i.e., moves away) due to shapes of the first and second loading cams 361 and 362 formed on the main slider 350.

A detailed structure and various operations of an example of a slot-in type disc drive are described below.

Figure 14:
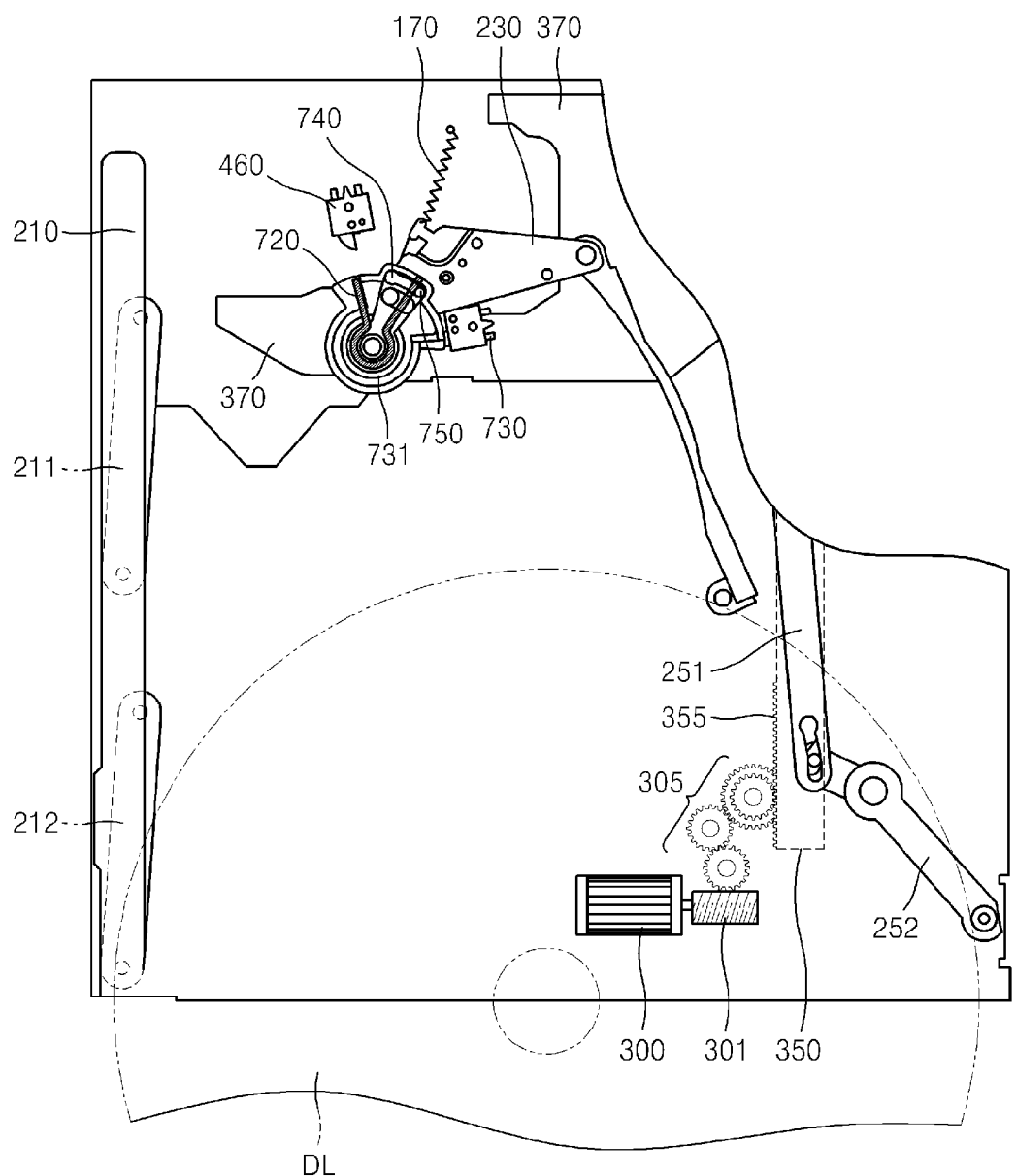
FIG. 14 is a drawing illustrating an example of a large-diameter storage medium as the storage medium is being manually inserted into a disc device.
Figure 15:
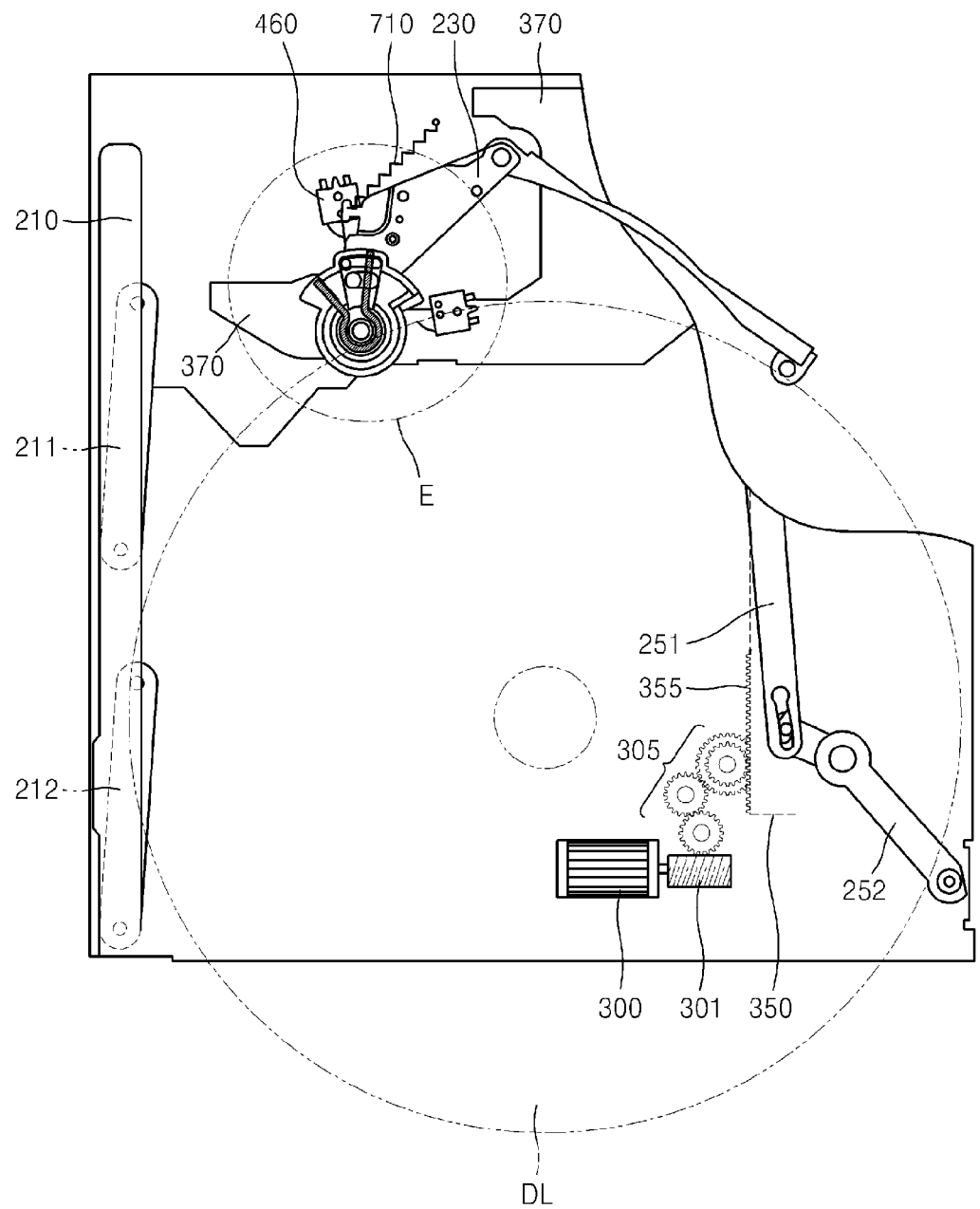
Figure 16:
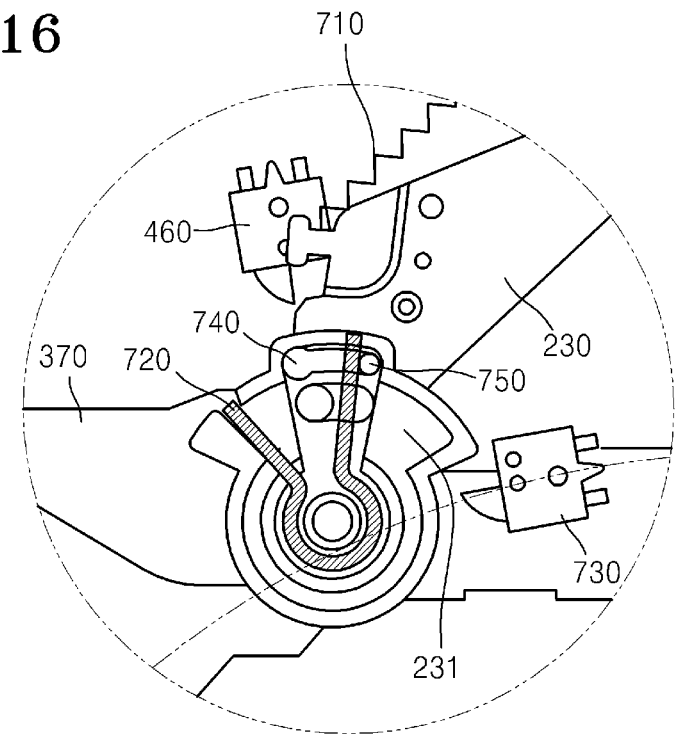
FIG. 16 is a drawing illustrating an example of a magnified portion of a portion of FIG. 15.
Figure 17:
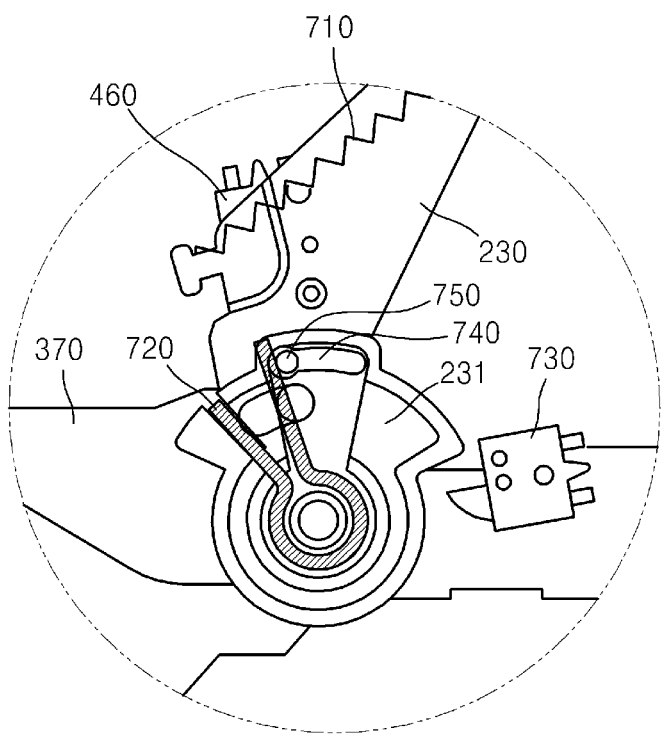
FIG. 17 is a drawing illustrating an example of a magnified portion of an disc device as a load, which is exerted in a loading direction of a storage medium, is absorbed by a protective structure.

FIG. 14 is a drawing illustrating an example of a large-diameter storage medium DL being manually inserted into a disc device. FIG. 15 is a drawing illustrating an example of a storage medium being inserted to a position such that a driver in a disc device is powered on in an disc device. FIG. 16 is a drawing illustrating an example of a magnified portion of a portion E of FIG. 15. FIG. 17 is a drawing illustrating an example of an absorbing spring 720 that is deformed between an ejection lever 230, which is rotated at a maximum angle by an external force, and a sub slider 370 of which a rotation position is fixed before the ejection lever 230 is rotated at the maximum angle, when a storage medium is completely inserted into the disc device.

For example, the absorbing spring 720 elastically supports the ejection lever 230 in an unloading direction of the storage medium. As the ejection lever 230 is rotated at a predetermined angle or more in a direction (e.g., a counterclockwise direction as illustrated in FIG. 17) that is the loading direction of the storage medium so that the sub slider 370 does not move any more, elasticity of the absorbing spring 720 is recovered so that the ejection lever 230 is further rotated.

In other words, if the large-diameter disc DL is excessively inserted into the disc device, the absorbing spring 720 is one component of a protective structure that is configured to prevent the internal components from being deformed due to external forces that are applied by the ejection lever 230. The protective structure may include a rotation-type spring supporter 731 including the absorbing spring 720, a press portion 750, an eject lever detecting switch SW4 730, and a press-portion escaping groove 740. The rotation-type spring supporter 731 and the ejection lever 230 are pivotally coupled so as to coaxially rotate at a fixed position. The rotation-type spring supporter 731 is interconnected (or interlocked) with the sub slider 370 in a partial region. The ejection lever 230 may be operated by rotation of the rotation-type spring supporter 731 that is interconnected with the sub slider 370 through the absorbing spring 720 and the rotation-type spring supporter 731. In spite of the rotation of the rotation-type spring supporter 731, if the ejection lever 230 deviates from a loading position of a storage medium and is excessively inserted into the disc device such that the rotation-type spring supporter 731 may not rotate any further, the ejection lever 230 compresses the absorbing spring 720 and further rotates.

The ejection lever 230 may be elastically biased in the unloading direction by an ejection lever spring 710. As described above, the absorbing spring 720 may be separately installed from the ejection lever spring 710 so as to elastically absorb an abnormal load that is exerted to the ejection lever 230 in the loading direction. As an example, ejection lever spring 710 may be a coil-type spring or a ring-type torsion spring.

For example, the press portion 750 formed on the ejection lever 230 engages an end portion of the absorbing spring 720, and elastically compresses the absorbing spring 720. The ejection lever detecting switch SW4 730 may be interconnected with the ejection lever 230. In addition, the ejection lever detecting switch SW4 730 may operate a driving switch SW5 460 based on a rotation degree of the ejection lever 230, or is connected to the sub slider 370 to convert an operation mode of the disc device. The press-portion escaping groove 740 makes an operation of the press portion 750 and an operation of the ejection lever detecting switch SW4 730 to be independent of each other such that the press portion 750 does not interfere with movement of the ejection lever detecting switch SW4 730. Although movement of the ejection lever detecting switch SW4 730 is stopped, the absorbing spring 720 is elastically compressed by movement of the ejection lever 230 and the press portion 750. As an example, the absorbing spring 720 may be a ring-type torsion spring mounted on a rotation center of the ejection lever 230. In addition, a first end portion of the absorbing spring 720 is fixed to the ejection lever detecting switch SW4 730, and a second end portion of the absorbing spring 720 contacts the press portion 750.

FIGS. 14 through 16 illustrate an example of a disc being manually inserted to a position so that a driver is powered on from a point of time when the disc starts to be inserted into the disc device. Referring to FIGS. 14 through 16, the absorbing spring 720 rotates together with the ejection lever detecting switch SW4 730 without elastic compression of the absorbing spring 720. When the disc is inserted so as to exceed the position shown in FIGS. 14 and 16, although the ejection lever 230 is engaged so as to continue rotating as the disc is further inserted, the ejection lever 230 keeps rotating. Accordingly, as illustrated in FIG. 17, rotation of the ejection lever detecting switch SW4 730 is stopped. Thus, the absorbing spring 720 is elastically compressed by the press portion 750 formed on the ejection lever 230 to absorb an abnormal load. When power is normally supplied to the disc device, the driving source 300 drives the rack 355 to move the main slider 350 to the position in FIGS. 15 and 16. However, when power is not supplied to the disc device, although the ejection lever 230 is rotated to the position in FIG. 17, because an operation of the driving source 300 is stopped, a standby mode of the main slider 350 is maintained.

Hereinafter, an example of an operation of a disc device if a storage medium is inserted after the disc device is powered or if a storage medium is inserted as the disc device remains in a standby mode or a sleep mode will be described.

As an example, if the disc device is not powered on, or if a drive driver (or a controller) does not wake up, and if a storage medium is inserted into the disc device, the storage medium is pushed out of the disc device so that a user may withdraw the storage medium. In addition, if the disc device is powered on, or if the drive driver wakes up from a sleep mode, a reset operation (a system stabilization operation) for determining whether the storage medium is inserted into the disc device is performed.

FIGS. 18A, 18B, 18C, and 18D are drawings illustrating examples of a storage medium being inserted into a disc drive when a driver is driven or is powered off.

Figure 18A:
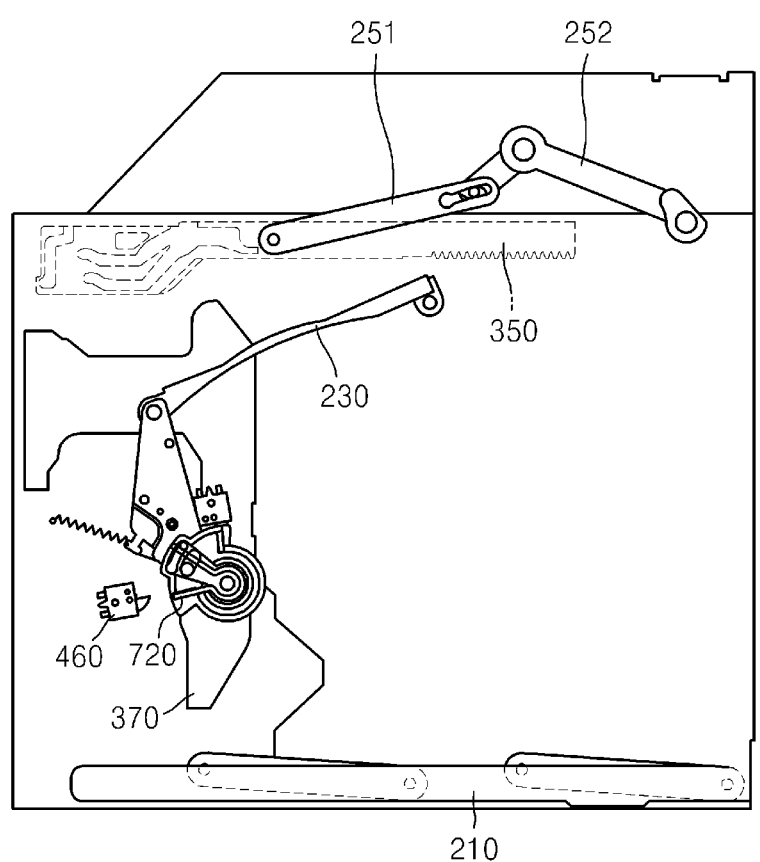
FIGS. 18A, 18B, 18C, and 18D are drawings illustrating examples of a storage medium inserted into the disc device as a driver is driven or is powered off.
Figure 18B:
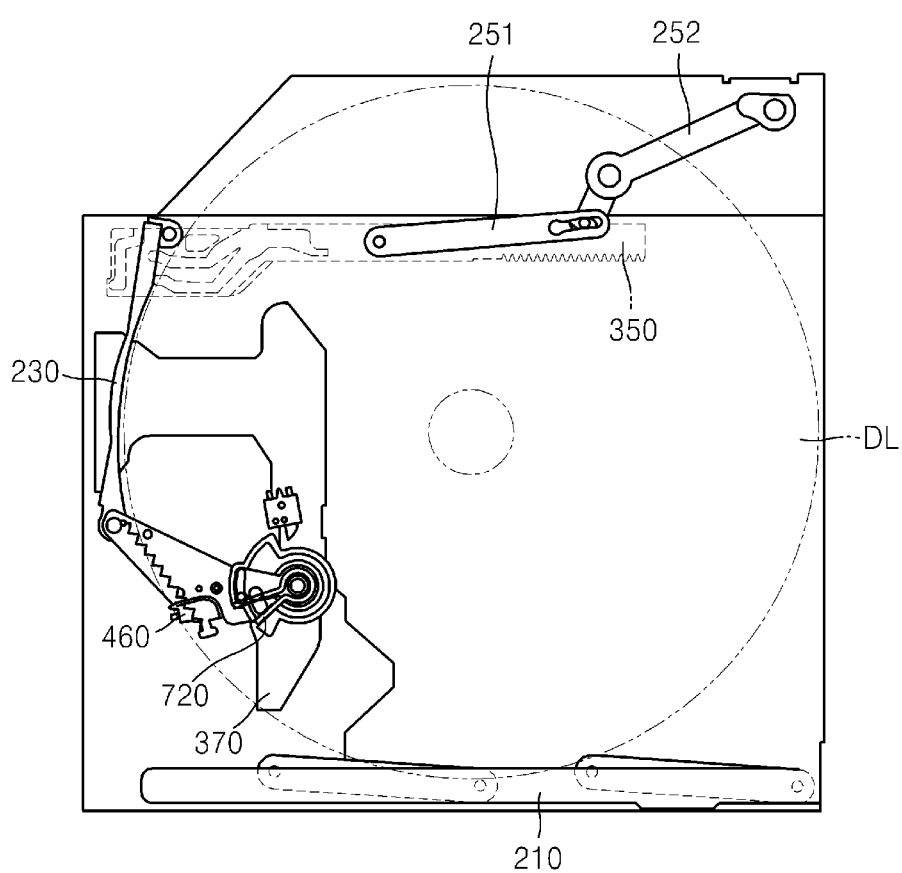
Figure 18C:
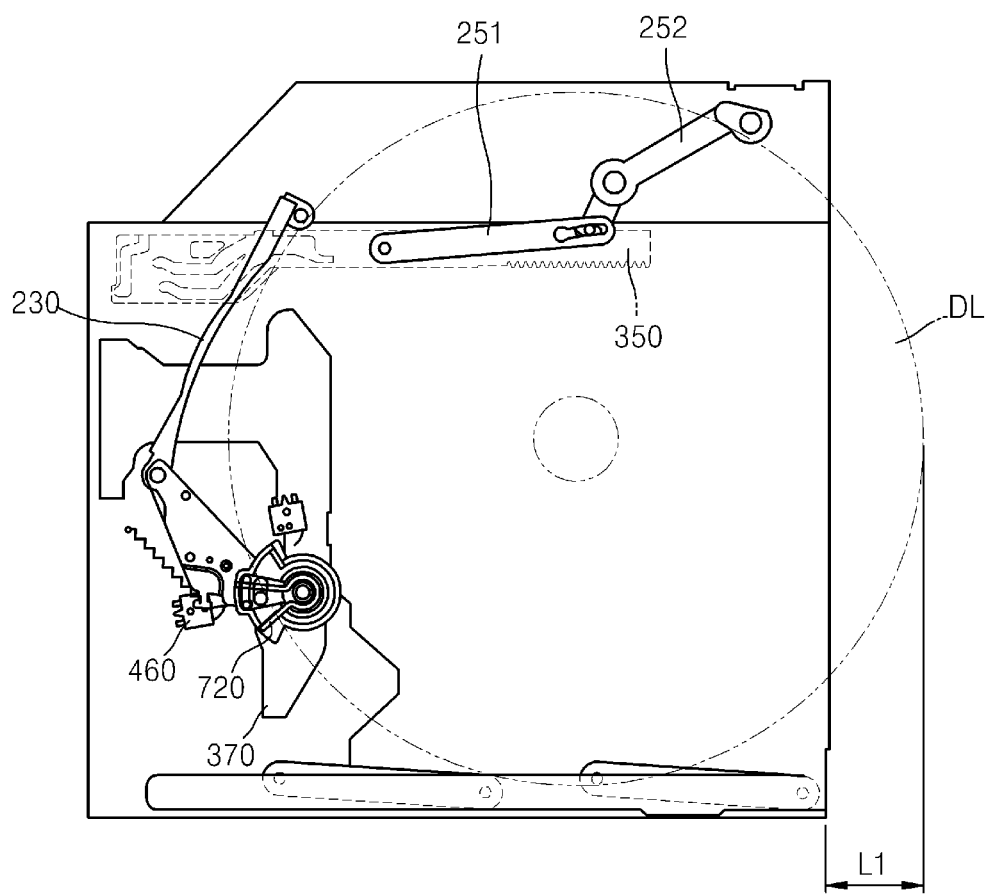
Figure 18D:
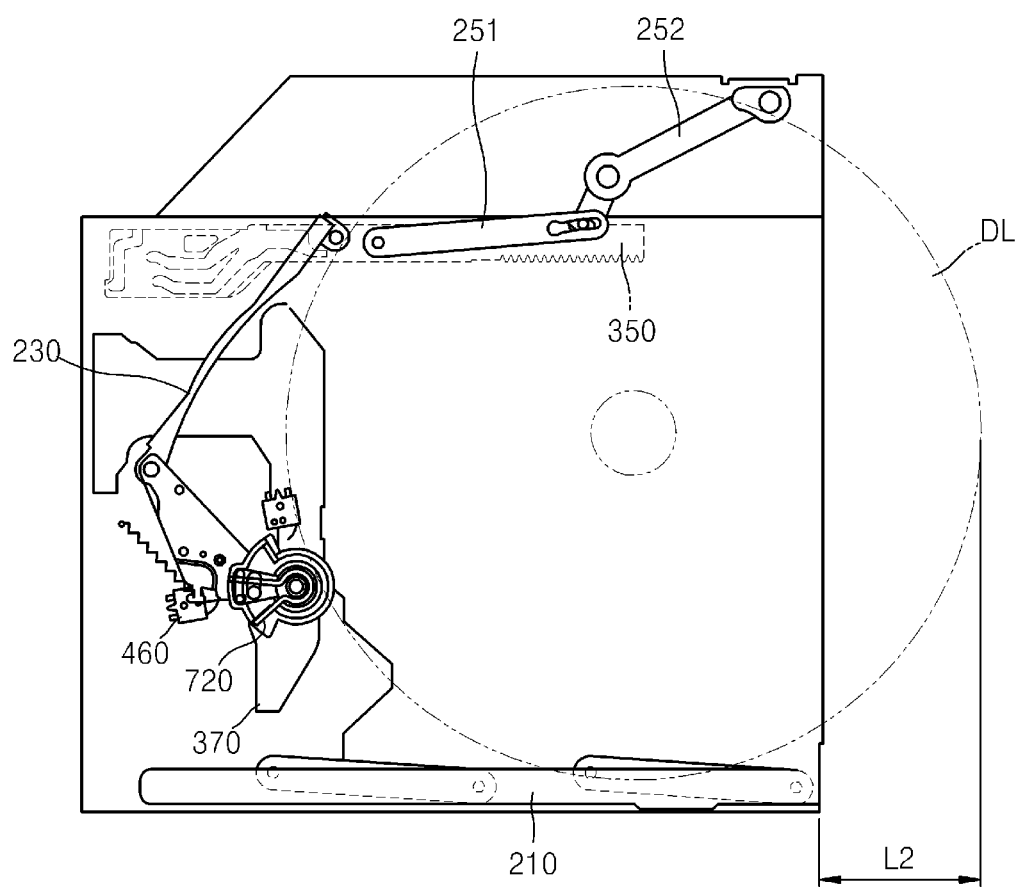

FIG. 18A illustrates a disc drive before a large-diameter storage medium DL (hereinafter, referred to as the storage medium DL) is inserted. For example, as illustrated in FIG. 18A, all components including the ejection lever 230, the guide lever 210, the second loading lever 252, and the like are in initial positions. As shown in FIG. 18B, if the storage medium DL is sufficiently inserted, the storage medium DL engages the ejection lever 230 so as to completely push and displace the ejection lever 230. As an example, if the storage medium DL is inserted so as to completely displace the ejection lever 230, an absorbing spring is compressed to generate a force for biasing or pushing the storage medium DL. For example, as illustrated in FIG. 18C, the storage medium DL is ejected or pushed out by a repulsive force so that the storage medium DL is pushed out through a slot as much as a length of "L1". As an example, this operation may be performed for a short period of time of about one second. For example, if the storage medium DL is inserted, the ejection lever 230 that is engaged by the storage medium DL operates the driving switch SW5 460 so that the driver starts to be driven, as described above. For example, it may take about 4 to 5 seconds for a disc drive to perform a driving operation including a reset operation of a microprocessor, or the like. The disc drive is then stabilized. For example, in this operation, a system driver or a controller (not shown) may move the main slider 350 to an initialization position. For example, the ejection lever 230 may rotate by a predetermined angle in an unloading direction that corresponds with a direction by which the storage medium DL is ejected. The ejection lever 230 may rotate by the predetermined angle in the unloading direction based on movement of the sub slider 370 which is interconnected with the main slider 350. The ejection lever 230 is rotated so as to further push the storage medium DL so that the storage medium DL may protrude from the disc device by a distance "L2" as shown in FIG. 18D. For example, if the driver tries to load and chuck the storage medium DL according to an on/off state of a plurality of switches connected to the main slider 350 and on-off of the driving switch SW5 460, because the storage medium DL that protrudes by the distance "L2" is not loaded and it is not checked whether the storage medium DL is inserted into the disc device, the storage medium DL is not chucked. A conventional disc device may not try to chuck a storage medium in order to prevent problems that may arise when a storage medium is loaded in an unstable state of the disc device. However, when a user inserts a storage medium before a system is stabilized, the user may experience the inconvenience of pushing the storage medium again after the disc device is completely driven. A user may be further inconvenienced when using a conventional disc device because the disc device may be configured as a low power-consumption structure that enters a sleep mode. Accordingly, a conventional disc device may repeat the sleep mode and operation mode thereby causing the use to reinsert the storage medium as the sleep mode and an operation mode are repeated, the user may repeatedly experience the above inconvenience. Thus, in order to use the conventional disc device as a low power type AV apparatus, the above problem of the conventional disc device needs to be overcome.

According to an aspect, a disc drive is driven by using a method that differs from the method used by a conventional disc device.

For example, if power is not supplied to the disc device or if a disc drive is in a standby mode, and if the storage medium DL is inserted into the disc device, the ejection lever 230 is coupled to an ejection device having a structure for pushing the storage medium DL to a loading position where the storage medium DL is loaded. The structure is obtained by structurally designing an ejection lever, an absorbing spring for elastically supporting the ejection lever, and a main slider for interference-movement of the ejection lever. For example, the disc device may be designed so that the storage medium DL may be ejected to a position where the storage medium DL is not loaded, by an ejection lever, and may be pushed to a loading position where the storage medium DL is loaded.

Figure 19A:
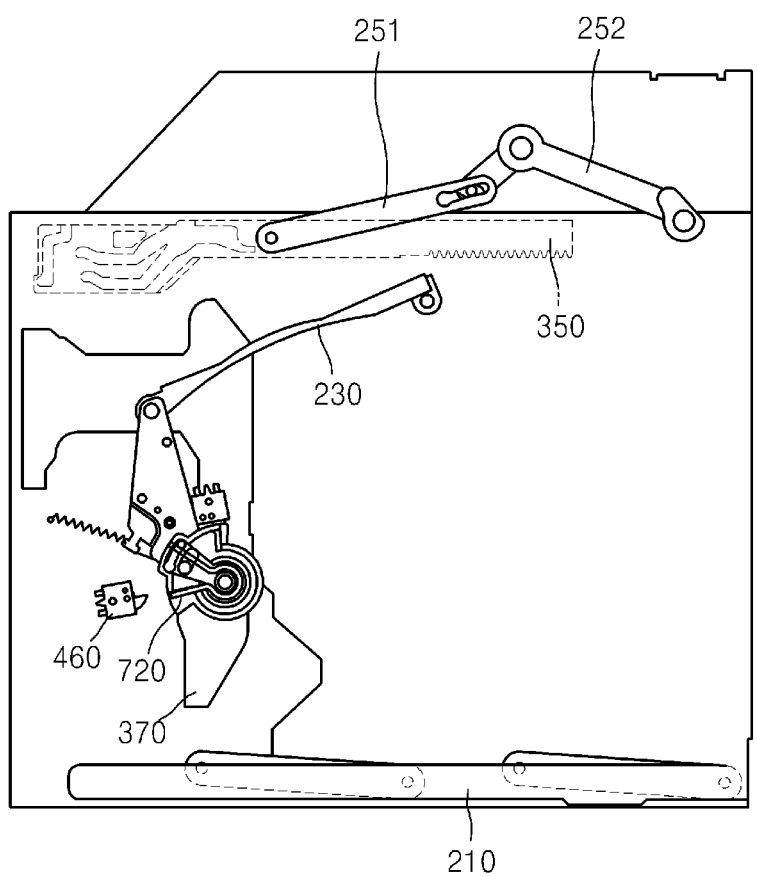
FIGS. 19A, 19B, and 19C are drawings illustrating examples of a distance by which a storage medium is pushed by an ejection lever in a disc device.
Figure 19B:
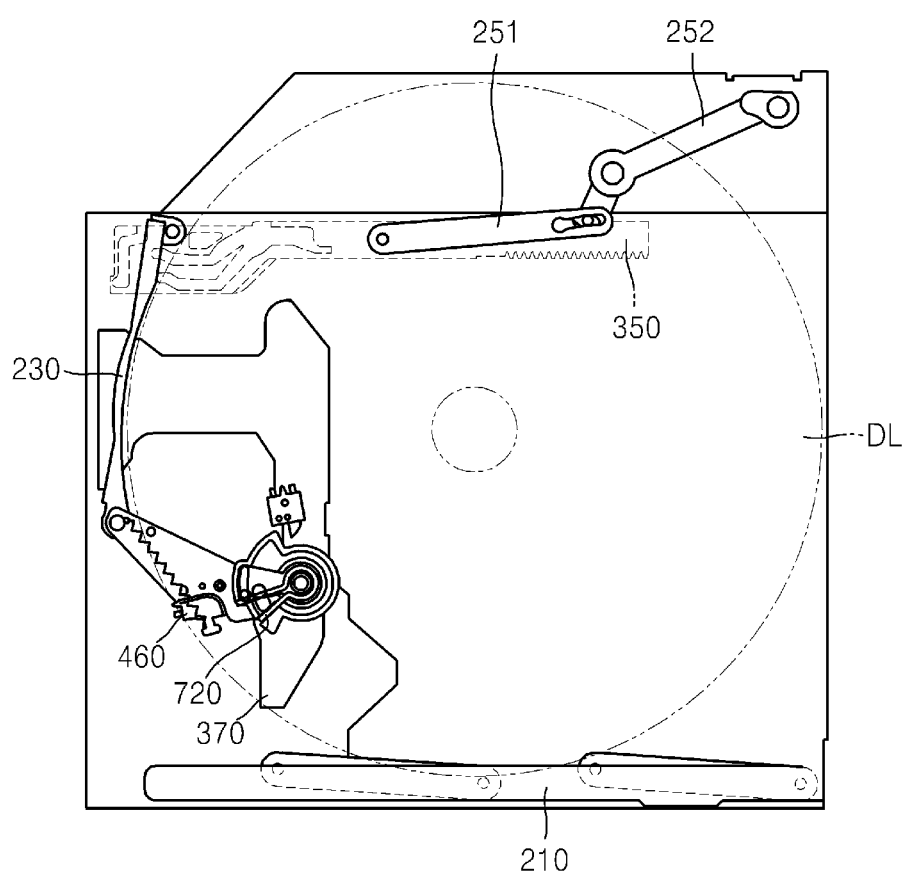
Figure 19C:
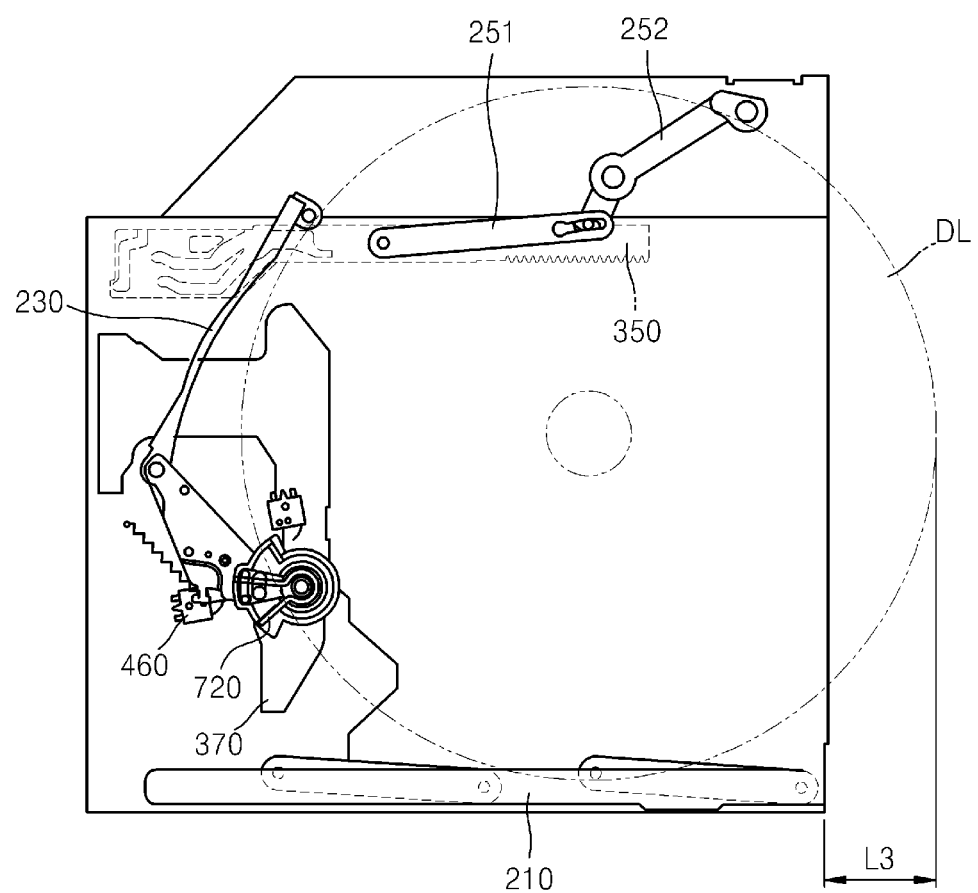

FIGS. 19A, 19B, and 19C illustrate an example of a distance by which a storage medium DL is pushed by an ejection lever in a disc device. For example, the storage medium DL may be pushed by a distance L3.

FIG. 19A illustrates an example of a configuration of a disc device when no storage medium DL is inserted regardless of whether the disc device is in a standby mode or an operation mode. FIG. 19B illustrates an example of a configuration of a disc drive if a storage medium DL is sufficiently inserted into the disc device through a slot. FIG. 19C illustrates an example of a configuration of a disc device if the storage medium DL is pushed out by the ejection lever 230 by the distance "L3". For example, the distance "L3" corresponds to a distance by which the storage medium DL is pushed to the loading position at which the storage medium DL is loaded. Conventionally, a distance L1 by which a storage medium is pushed in a disc device is 30.5 mm, and a distance L2 by which the storage medium is further pushed by a reset operation is 41.4 mm. A conventional disc device is designed so that the storage medium is loaded in the range of a distance of 24 to 30 mm. Thus, because the storage medium is pushed by the distances L1 and L2, the conventional disc device may not load the disc. Conversely, under the same condition, in an aspect, the storage medium DL may be positioned at a position where the storage medium is sufficiently loaded even if the storage medium DL is further pushed due to other mechanical operations by the distance L3, for example, about 14 mm. As an example, an elasticity of the absorbing spring 720 may be reduced if the distance L3 is adjusted. To this end, the disc device may be configured such that the distance by which the storage medium DL is discharged is sufficient in order to withdraw the storage medium DL. For example, a compression degree of an absorbing spring 720 for exerting an elastic force to the ejection lever 230 may be reduced by controlling operational timing of a cam during a reset operation of the main slider 350 rather than controlling elasticity of the absorbing spring 720. Accordingly, a rotation angle of the ejection lever 230 may be reduced. In order to reduce the compression degree and/or the rotation angle, by changing a position of a main slider or timing of the cam, an operational period of time of the main slider 350 during the reset operation may be increased relative to that of a conventional disc device.

In one aspect, an inserted storage medium is always positioned at the loading position, and thus, a reset mode for detecting whether the storage medium is inserted may be omitted.

Figure 20A:
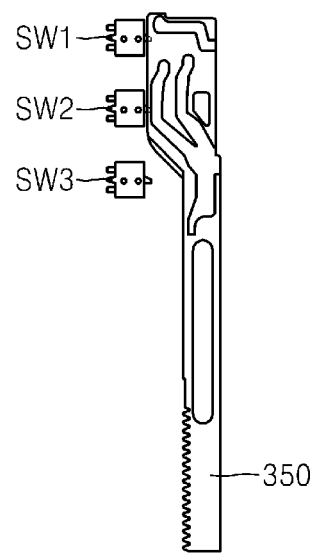
FIGS. 20A, 20B, and 20C are drawings that illustrate examples of modes of three switches according to positions of a main slider, in a disc device.
Figure 20B:
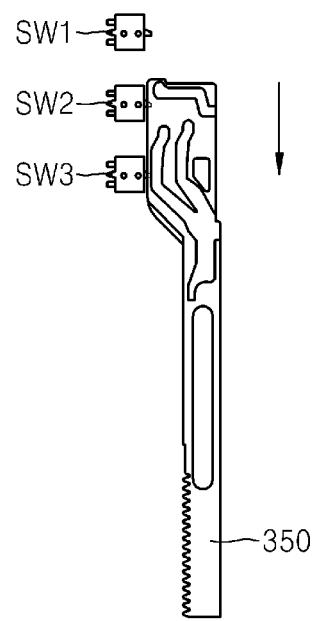
Figure 20C:
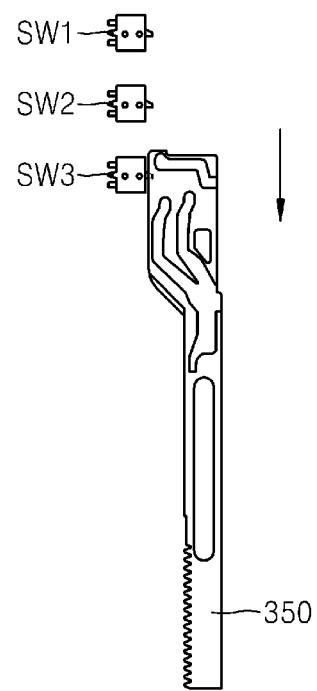

FIGS. 20A, 20B, and 20C illustrate examples of modes of three switches SW1, SW2, and SW3 based on positions of the main slider 350 in an disc device. For example, Table 1 shows whether a storage medium is capable of being loaded according to a switch mode. In Table 1, * represents that the storage medium is detected.

TABLE 1

| Mode (Position) | | Ejection Completed | Intermediate 1 | Reset position | Intermediate 2 | Chucking Completed |
|---|---|---|---|---|---|---|
| Conventional | SW mode | SW1: LOW* SW2: LOW SW3: HIGH | SW1: HIGH SW2: LOW SW3: HIGH | SW1: HIGH SW2: HIGH* SW3: HIGH | SW1: HIGH SW2: HIGH SW3: HIGH | SW1: HIGH SW2: HIGH SW3: LOW* |
| | Loading operation | Cannot | Can | Can | Cannot | Cannot |
| Example Disc Device | SW mode | SW1: LOW* SW2: LOW SW3: HIGH | SW1: HIGH SW2: LOW SW3: HIGH | SW1: HIGH SW2: LOW* SW3: HIGH | SW1: HIGH SW2: HIGH SW3: HIGH | SW1: HIGH SW2: HIGH SW3: LOW* |
| | Loading operation | Cannot | Can | Can | Cannot | Cannot |

As shown in Table 1, if the switches SW1, SW2, and SW3 are in LOW, LOW, and HIGH, the storage medium is completely ejected. If the storage medium is not inserted, the disc device is not capable of performing the loading operation. The main slider is moved so that the disc device is capable of performing the loading operation. In a state of the intermediate 1 and a rest position. However, the storage medium is not capable of being loaded at intermediate 2 position. Because the switches have the same state at the reset position and the intermediate 2 position, the reset position and the intermediate 2 position may not be distinguished by using states of the switches. Accordingly, a reset operation needs to be performed although the storage device is capable of being loaded. For example, intermediate 1 position and the reset position correspond to the same state of the switches, and thus, the storage medium is capable of being loaded. However, in intermediate 2 position, all switches are in HIGH, and the storage medium is not capable of being loaded.

Table 1 shows that the storage medium is capable of being loaded at two adjacent positions in a single state, and thus, the storage medium is capable of being immediately loaded without a rest operation.

Figure 21:
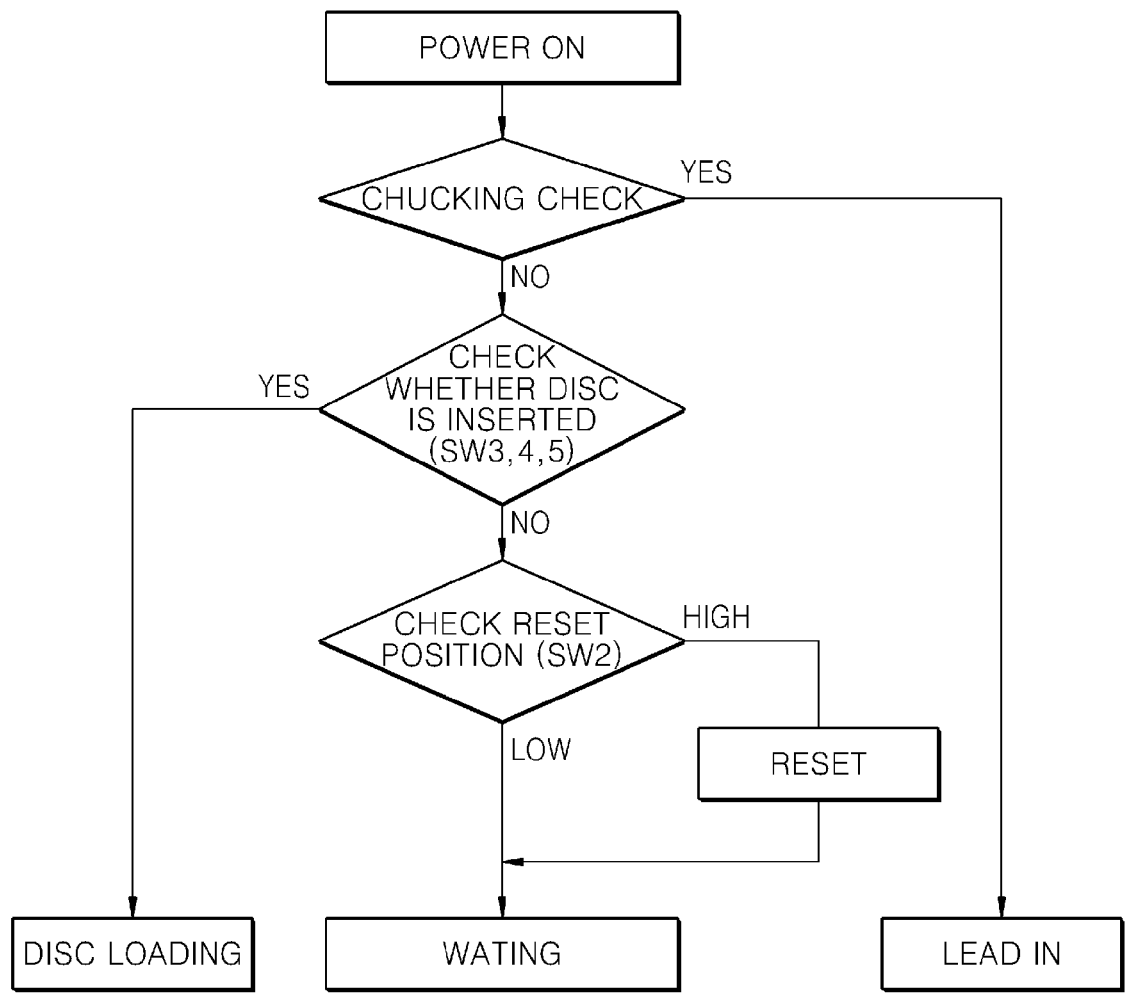
FIG. 21 is a flowchart illustrating an example of a storage medium loading operation after a disc drive is powered on in a method of driving a disc device.

FIG. 21 is a flowchart illustrating an example of a storage medium loading operation after a disc drive is powered on in a method of driving an disc device.

Referring to FIG. 21, after the drive is powered on, it is determined whether a storage medium is chucked. For example, it is determined whether the switches SW1, SW2, and SW3 of Table 1 are in HIGH, HIGH, or LOW. If a determination standard is satisfied (e.g., if the determination as to whether the storage medium is chucked is YES), a Lead-in operation for reading disc initial information proceeds. If the determination standard is not satisfied (e.g., if the determination as to whether the storage medium is chucked is NO), the states of the switches SW3, SW4 730, and SW5 460 are determined, and it is determined whether the storage medium is inserted or the storage medium is inserted and loaded. If the storage medium is inserted, a disc loading is performed, and then the Lead-in operation proceeds. If the storage medium is not inserted, a state of the switch SW2 is checked, and a reset position is determined. In this case, if a current position is the reset position, a reset operation is performed. If the current position is not the reset position, the method enters a standby mode for waiting for the storage medium to be inserted.

If the storage medium is inserted, the drive is powered on. In other words, when power is supplied to the drive while the method enters from the standby mode to an operation mode, disc loading and chucking are immediately performed, and thus, a rest mode is not omitted unlike in a conventional method of driving a disc drive.

In the future, rapid development of smart televisions is expected. However, when a roller type disc device or a slot-in type disc device is used in a smart television, such disc devices are likely to scratch storage mediums, such as blue ray discs, having high recording densities. In addition, such disc devices have restrictions regarding thinning thereof. However, according to the examples described herein, such disc devices may not scratch a storage medium relative to a conventional roller type disc device. Further, according to an aspect, a disc device may include a slot having lever-type loading mechanism. In some aspects, the problems that arises after power is supplied to a conventional disc device when a storage medium is inserted, or when the storage medium is inserted before a system is not stabilized, may be overcome, thereby increasing user's convenience.

In one aspect, the disc device may include an ejection device that includes an ejection lever that is configured to push the storage medium, an absorbing spring that is configured to exert an elastic force onto the ejection lever, and a bracket that is configured to support the absorbing spring while being coaxially rotated with the ejection lever.

According to an aspect, a disc device as described above is connected to a multimedia apparatus that includes at least one of a display device and an audio output device. Examples of the multimedia apparatus may include a television, a set-top box, or the like. For example, the multimedia apparatus may be any apparatus as long as it includes a display device and an audio output device, and uses a disc device. The multimedia apparatus includes a power saving circuit for powering-off a disc device when the disc device is not used. In addition, the multimedia apparatus supplies power to the disc device to wake the disc device up when a storage medium is inserted into the disc device.

The disk drive may be included in an electronic device. As a non-exhaustive illustration only, an electronic device described herein may refer to mobile devices such as a digital camera, a portable game console, a portable/personal multimedia player (PMP), a portable lap-top PC, and devices such as a desktop PC, a high definition television (HDTV), an optical disc player, a setup box, and the like capable of wireless communication or network communication consistent with that disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A disc device comprising:
a loading unit configured to load a storage medium into the disc device;
a chucking unit configured to accommodate the loaded storage medium thereon;
an ejection unit configured to eject the storage medium;
a controller configured to control operation of the loading unit, the chucking unit, and the ejection unit,
wherein the ejection unit moves the storage medium to a loading position for loading the storage medium onto the chucking unit in response to the storage medium being initially inserted, and comprises an ejection lever and a bracket that are configured to rotate coaxially.

2. The disc device of claim 1, wherein the election lever is configured to engage the storage medium, the ejection unit further comprises an absorbing spring that is configured to exert an elastic force onto the ejection lever, and the bracket is configured to support the absorbing spring.

3. The disc device of claim 2, wherein the absorbing spring exerts the elastic force onto a predetermined region of the ejection lever in response to the ejection lever rotating the storage medium in a direction in which the storage medium is loaded.

4. The disc device of claim 1, further comprising a driving switch that is interconnected with the ejection unit and is connected to a circuit that is configured to drive the loading unit,
wherein the driving switch maintains an on-state in response to the storage medium being initialized.

5. The disc device of claim 1, wherein, in response to the storage medium being initialized, the loading unit loads the storage medium onto the chucking unit without initializing a reset operation of the system.

6. The disc device of claim 1, wherein, in response to the storage medium being inserted, if the controller is driven, the controller controls the loading unit and the chucking unit to load the storage medium onto the chucking unit.

7. A multimedia apparatus comprising:
a disc device comprising a loading unit that is configured to load a storage medium into the disc device, a chucking unit that is configured to accommodate the loaded storage medium thereon, an ejection unit that is configured to eject the storage medium and to move the storage medium to a loading position for loading the storage medium to the chucking unit in response to the storage medium being inserted, and a controller that is configured to control operation of the loading unit, the chucking unit, and the ejection unit; and
an output unit that is configured to output a signal provided from the disc device,
wherein the ejection unit comprises an ejection lever and a bracket that are configured to rotate coaxially.

8. The multimedia apparatus of claim 7, wherein the ejection lever is configured to engage the storage medium, the ejection unit further comprises an absorbing spring that is configured to exert an elastic force onto the ejection lever, and the bracket is configured to support the absorbing spring.

9. The multimedia apparatus of claim 8, wherein the absorbing spring exerts the elastic force onto a predetermined region of the ejection lever in response to the ejection lever rotating the storage medium in a direction in which the storage medium is loaded.

10. The multimedia apparatus of claim 7, wherein, in response to the disc device not being used, the disc device is powered off, and
wherein, in response to a storage medium being inserted into the disc device, the disc device is driven by supplying power to the disc device.

11. A method of driving an disc device comprising a loading unit that is configured to load a storage medium into the disc device, a chucking unit that is configured to accommodate the loaded storage medium thereon, an ejection unit that is configured to eject the storage medium for moving the storage medium to a loading position for loading the storage medium onto the chucking unit in response to the storage medium being initially inserted, and a controller that is configured to control operation of the loading unit, the chucking unit, and the ejection unit, the method comprising:
supplying power to the disc device;
determining whether the storage medium is in the loading position;
if it is determined that the storage medium is inserted, loading the storage medium by the loading unit without initialization of the ejection unit; and
initializing the loading unit when the storage medium is not inserted,
wherein the ejection unit comprises an ejection lever and a bracket that are configured to rotate coaxially.

12. The method of claim 11, wherein the ejection lever is configured to engage the storage medium, the ejection unit further comprises an absorbing spring that is configured to exert an elastic force onto the ejection lever, and the bracket is configured to support the absorbing spring.

13. The method of claim 12, wherein the absorbing spring exerts the elastic force onto a predetermined region of the ejection lever only in response to the ejection lever rotating the storage medium in a direction in which the storage medium is loaded.

14. The method of claim 11, wherein, in response to the storage medium being inserted into the disc device, the power is supplied to the disc device.

15. The method of claim 11, wherein the disc device is connected to a multimedia apparatus comprising an output unit, and
wherein, in response to the storage medium being inserted into the disc device, the power is supplied from the multimedia apparatus.

16. The method of claim 13, wherein, in response to the disc device not being used, the multimedia apparatus shuts power to the disc device.

17. An electronic device, the electronic device including the disc device of claim 1.

18. The electronic device of claim 17, wherein the electronic device is one of a portable game console, a portable/personal multimedia player (PMP), a portable lap-top PC, a desktop PC, a game console, a high definition television (HDTV), an optical disc player/recorder, and a set top box.

19. The disc device of claim 1, the disc device further comprising a plurality of switches each of which detects the state of at least one of the loading unit, the chucking unit, and the ejection unit;
wherein the controller controls operation of the loading unit, the chucking unit, and the ejection unit based on states of the switches at least a subset of the plurality of switches.

20. The disc device of claim 19, wherein in response to power being initially supplied to the disc device, the controller determines whether the storage medium is inserted, and based on such determination, if the storage medium is inserted then the loading unit loads the storage unit without initialization of the ejection unit; and if the storage medium is not inserted then the loading unit is initialized.

21. The disc device of claim 1, the disc device further comprising a guide lever comprising a first link and a second link rotatably attached by a lever hinge for guiding the storage medium onto the chucking unit in response to the storage medium being initially inserted.

* * * * *